United States Patent
Bahrami et al.

(10) Patent No.: US 11,042,427 B2
(45) Date of Patent: Jun. 22, 2021

(54) AUTOMATED CONSOLIDATION OF API SPECIFICATIONS

(71) Applicant: FUJITSU LIMITED, Kawasaki (JP)

(72) Inventors: Mehdi Bahrami, Santa Clara, CA (US); Abhilash Ugaonkar, Sunnyvale, CA (US); Wei-Peng Chen, Fremont, CA (US)

(73) Assignee: FUJITSU LIMITED, Kawasaki (JP)

(*) Notice: Subject to any disclaimer, the term of this patent is extended or adjusted under 35 U.S.C. 154(b) by 101 days.

(21) Appl. No.: 16/177,187

(22) Filed: Oct. 31, 2018

(65) Prior Publication Data

US 2020/0133751 A1    Apr. 30, 2020

(51) Int. Cl.
    *G06F 9/54*      (2006.01)
    *G06F 8/41*      (2018.01)
    *G06F 8/36*      (2018.01)

(52) U.S. Cl.
    CPC ............... *G06F 9/548* (2013.01); *G06F 8/36* (2013.01); *G06F 8/437* (2013.01)

(58) Field of Classification Search
    CPC ............. G06F 9/548; G06F 8/36; G06F 8/437
    See application file for complete search history.

(56) References Cited

U.S. PATENT DOCUMENTS

2016/0019102 A1*   1/2016   Cui .................... G06F 9/542
                                                                          719/328
2020/0192727 A1*   6/2020   Savenkov ............ G06F 16/367
2020/0301760 A1*   9/2020   Janakiraman ........... G06F 9/54
2020/0364044 A1*   11/2020   Bahrami .................. G06F 8/73

OTHER PUBLICATIONS

Ryan Pinkham; Improve Your API Documentation Workflow with Compare & Merge in SwaggerHub; Jan. 6, 2017; 5 pages (Year: 2017).*
Comparing and Merging Files; Mar. 2000; 68 pages (Year: 2000).*
U.S. Appl. No. 15/729,522, filed Oct. 10, 2017.
U.S. Appl. No. 15/715,658, filed Sep. 26, 2017.

* cited by examiner

*Primary Examiner* — Doon Y Chow
*Assistant Examiner* — Kimberly L Jordan
(74) *Attorney, Agent, or Firm* — Maschoff Brennan

(57) ABSTRACT

A method may include receiving first and second application programming interface (API) specifications. The method may include comparing first and second API Specification according to a set of criteria. Responsive to the first and second criteria being identical, the method may include identifying first and second objects. Responsive to the first and second criteria being identical, the method may include classifying a type of the first and second objects and associating one or more parameters in the first and second objects with a consolidated object. The one or more parameters in the first and second objects may be associated with the consolidated object based on the type of the first and second object. The method may include generating a consolidated specification that includes the consolidated object and a description of the one or more parameters of the first and second objects that are associated with the consolidated object in a single API specification.

20 Claims, 14 Drawing Sheets

```
⊟ { } JSON
    ⊟ { } Info                          1346
        ▨ Preferred : True
        ■ Description : "Help The Third Party Sites To Implement Federated Login."
        ■ Title : "Google Identity Toolkit"
1348b   ■ Version : "v3"
        ■ ProviderName : "Googleapis.Com"
        ⊞ { } Contact
        ⊞ { } Logo
        ⊞ { } Origin
        ⊞ { } ApiClientRegistration
        ■ ServiceName : "IdentityToolkit"
1350b ⊞ { } Paths
      ⊞ [ ] Schemes
      ⊞ { } Parameters
      ⊞ [ ] Tags
      ■ BasePath : "/Identitytoolkit/v3/relyingparty"
      ⊞ { } Security Definitions
      ■ Host : "www.googleapis.com"
      ⊞ { } Definitions
      ■ Swagger : "2.0"
      ⊞ { } ExternalDocs
```

AUTOMATED CONSOLIDATION OF API SPECIFICATIONS

FIELD

The embodiments discussed in the present disclosure are related to automated consolidation of similar application programming interface (API) specifications.

BACKGROUND

Software applications may be built using one or more application programming interfaces (API or APIs), each of which is a set of routines, protocols, and tools. API specifications specify how other software components interact with the API based on its definition. APIs may also be used to show the results in a graphical user interface (GUI) component. An API may expose at least some functions and/or data of a software application that enables other applications to use resources of the API without concern for implementation of the functions or data. Additionally, API specifications may be stored in repository specific formats in different repositories.

The subject matter claimed in the present disclosure is not limited to embodiments that solve any disadvantages or that operate only in environments, such as those described. Rather, this background is only provided to illustrate one example technology area where some embodiments described in the present disclosure may be practiced.

SUMMARY

According to an aspect of an embodiment, a method for consolidation of similar application programming interface (API) specifications may include receiving a first API specification and a second API specification. The first API specification and the second API specification may be machine-readable. The method may also include comparing a first edited API criteria of the first API specification to a second edited API criteria of the second API specification. Responsive to the first edited API criteria being identical to the second edited API criteria, the method may include identifying a first object in the first API specification. The first object may include one or more parameters. Responsive to the first edited API criteria being identical to the second edited API criteria, the method may also include identifying a second object in the second API specification. The second object may also include one or more parameters. Responsive to the first edited API criteria being identical to the second edited API criteria, the method may additionally include classifying a type of the first object and a type of the second object. Responsive to the first edited API criteria being identical to the second edited API criteria, the method may include associating the one or more parameters included in the first object and the one or more parameters included in the second object with a consolidated object. The one or more parameters included in the first object and the one or more parameters included in the second object may be associated with the consolidated object based on the type of the first object and the type of the second object. Additionally, the method may include generating a consolidated API specification. The consolidated API specification may include the consolidated object. The consolidated API specification may be machine-readable. The consolidated API specification may also include a description of the one or more parameters of the first object and the one or more

2 parameters of the second object that are associated with the consolidated object in a single API specification.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 13A-13B illustrate example machine-readable API specifications that may be implemented in the operating environment of FIG. 1, all according to at least one embodiment described in the present disclosure.

DESCRIPTION OF EMBODIMENTS

Figure 1:
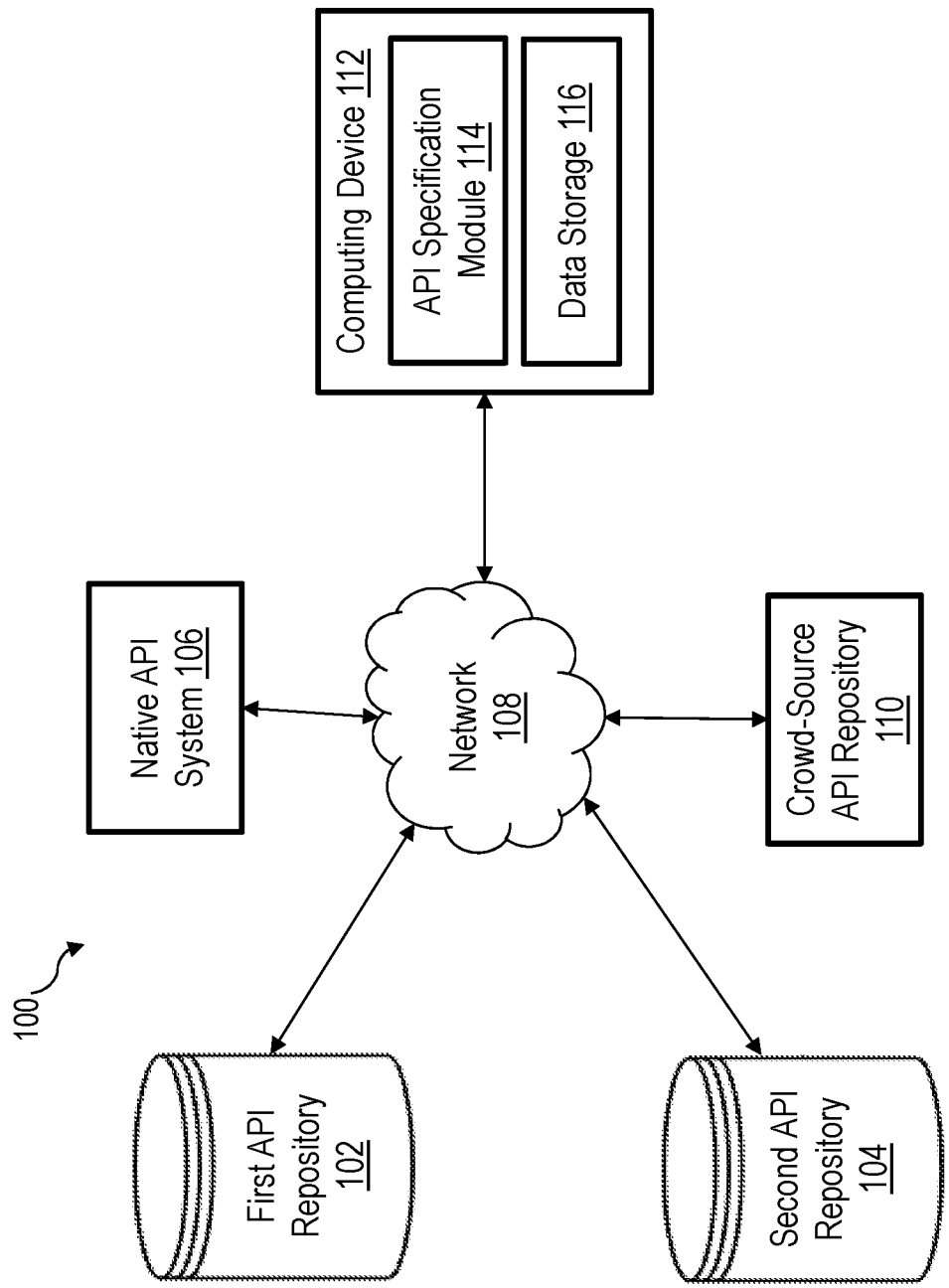
FIG. 1 illustrates a block diagram of an example operating environment in which application programming interface (API) specification consolidation may be implemented.

Embodiments described in the present disclosure relate to consolidation of application programming interface (API) specifications. The API specifications that are consolidated may be directed to similar APIs and are stored in different formats. Additionally, the API specifications may include uncommon API objects. Additionally still, the API specifications, which are directed to the similar API, may be stored in multiple repositories (e.g., different repositories). For example, the API specifications may be stored in both an API Guru repository and an API Harmony repository. The repositories may store the API specifications using the same API schema (e.g., similar API formats). However, the API specifications may include variations in API object labelling or other differences. For example, the API specifications may be stored using a Swagger format in the repositories, but other optional information may be added within the API specifications (e.g., "x-privacy" to describe privacy of an API) or API object labels or API parameter labels within the API specifications may be different in the different repositories. Some examples of labelling differences may include a difference in a number of blank spaces, a name, a value for a name, or some combination thereof.

The different labelling of the API criteria, the API objects, and/or the API parameters may cause information to be scattered due to the API specifications being stored in the different API repositories. The embodiments described in the current disclosure provide a technical solution to generate a consolidated API specification based on the API specifications despite including different labelling for the API objects, the API parameters, and/or the API criteria along with uncommon objects for the similar API. The embodiments described in the current disclosure provide a technical solution to the current inability of computing systems to determine whether consolidated objects in the consolidated API specification include inconsistencies.

The embodiments described in the current disclosure provide a technical solution to the current inability of computing systems to access and use API specifications directed to the similar API but include different labelling of the API criteria, the API objects, and/or the API parameters. Likewise, the embodiments described in the current disclosure provide a technical solution to the current inability of computing systems to resolve the inconsistencies that are discovered in the consolidated API objects.

In particular, some embodiments may generate the consolidated API specification, which may be implemented to provide a ground truth of the similar API. In the embodiments, two or more API specifications directed to the similar API may be received. The API specifications may include API objects and API parameters. Additionally, the API specifications may include information describing the API objects, the API parameters, and the API criteria. The API objects, the API parameters, the API criteria, and the information describing the API objects and the API parameters may be formatted differently in each API specification in accordance with repository specific formatting. For example, one repository may add a character sequence "api" to a start of a title (e.g., may add "api" to an API criteria) of the API specification and another repository may add the character sequence "api" to an end of a title of the API specification.

The embodiments may determine whether the API specifications are directed to the similar API by editing one or more of the API criteria to remove the repository specific formatting. Additionally, the embodiments may compare the edited API criteria. If the edited API criteria are identical, the API specifications may be directed to the similar API. Additionally, the embodiments may classify a type of each API object in the API specifications. Furthermore, the embodiments may consolidate the API parameters of the objects in the API specifications based on the object types of the API objects into one or more consolidated objects. Additionally, the embodiments may generate the consolidated API specification to include each of the consolidated objects and the uncommon API objects.

Furthermore, the embodiments may determine whether an inconsistency is included in one or more of the consolidated objects. If one or more of the consolidated objects include an inconsistency (e.g., the consolidated API specification includes one or more inconsistent consolidated objects), then the embodiments may receive a crowd-source API specification directed to the similar API. The crowd-source API specification may include response information for each API object in the crowd-source API specification. The embodiments may also communicate by sending a request to a native API system using the API parameters of the one or more inconsistent consolidated objects. Response information may be received from the native API system based on the requests communicated using the parameters of the one or more inconsistent consolidated objects. The embodiments may compare the response information received from the native API system to the response information included in related API objects from the crowd-source API specification. If the response information received from the native API system is the same as or similar to the response information included in the related API objects, the inconsistent consolidated objects may not cause errors during operations and the inconsistent consolidated objects may not be updated. If the response information received from the native API system is not the same as or similar to the response information included in the related API objects, the inconsistent consolidated objects may be updated to include at least a portion of the related objects from the crowd-source API specification.

A benefit of the consolidated API specifications may include efficient and reliable building of software applications, updating of software applications that employ the similar API, or some combination thereof using all data and/or information included in the different repositories. For example, some software applications may employ the similar API for interaction with different systems. Consolidation of the API specifications may allow the software applications to generate a ground truth of the similar API (e.g., a universal translator of the API specifications that are directed to the similar API) to allow the software applications to properly interact with systems that may use different API specifications for the similar API. Accordingly, the generation of the consolidated API specifications described in the present disclosure may be used to verify, develop, or modify the process of using APIs.

Some embodiments described in the present disclosure are related to an Internet-centric technological field. For example, the embodiments described in the present disclosure relate to information extraction from computing systems using APIs. The computing systems may, in some embodiments, be communicatively connected via a computing network, such as a network 108 described below. These and other embodiments are described with reference to the appended Figures in which like item numbers indicate like function and structure unless described otherwise.

FIG. 1 illustrates a block diagram of an example operating environment 100 in which API specification consolidation may be implemented. The operating environment may include a computing device 112, which may be configured for API specification consolidation that is directed to similar APIs. The operating environment 100 may include a first API repository 102, a second API repository 104, a network 108, a native API system 106, a crowd-source API repository 110, and the computing device 112. The first API repository 102, the second API repository 104, the native API system 106, the crowd-source API repository 110, the computing device 112, or some combination thereof may communicate information and data via the network 108.

Each of the first API repository 102, the second API repository 104, the computing device 112, the native API system 106, the crowd-source API repository 110, and the network 108 are briefly described below.

The network 108 may include any communication network configured for communication of signals between any of the components (e.g., 102, 104, 106, 110, and 112) of the operating environment 100. The network 108 may be wired or wireless. The network 108 may have numerous configurations including a star configuration, a token ring configuration, or another suitable configuration. Furthermore, the network 108 may include a local area network (LAN), a wide area network (WAN) (e.g., the Internet), and/or other interconnected data paths across which multiple devices may communicate. In some embodiments, the network 108 may include a peer-to-peer network. The network 108 may also be coupled to or include portions of a telecommunications network that may enable communication of data in a variety of different communication protocols.

In some embodiments, the network 108 includes or is configured to include a BLUETOOTH® communication network, a Z-Wave® communication network, an Insteon® communication network, an EnOcean® communication network, a Wi-Fi communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communication network, any similar communication networks, or any combination thereof for sending and receiving data. The data communicated in the network 108 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the first API repository 102, the second API repository 104, the native API system 106, the crowd-source API repository 110, and the computing device 112.

The first API repository 102, the second API repository 104, and the crowd-source API repository 110 may include any memory or data storage, which may be similar to a memory 338 discussed elsewhere in the present disclosure. The first API repository 102, the second API repository 104, and the crowd-source API repository 110 may include network communication capabilities such that other components in the operating environment 100 may communicate with the first API repository 102, the second API repository 104, and/or the crowd-source API repository 110.

The first API repository 102, the second API repository 104, and the crowd-source API repository 110 may be configured to store various data. For example, the first API repository 102, the second API repository 104, and the crowd-source API repository 110 may store machine-readable API specifications (e.g., API documentations).

The first API repository 102 and the second API repository 104 may include any computer-based or hardware-based computing system. The first API repository 102 and the second API repository 104 may include a system or device with which API specifications are configured to be stored. The first API repository 102 and the second API repository 104 may include API specifications that describe APIs according to one or more repository-specific formats.

The crowd-source API repository 110 may include any computer-based or hardware-based computing system. The crowd-source API repository 110 may include a system or device with which crowd-source API specifications are configured to be stored. For example, the crowd-source API repository 110 may include API specifications that have been crowd proofed by users of the API or other users to act as definitions of API information and/or API criteria. As another example, the crowd-source API repository, may include API specifications that include API information and/or API criteria that has been validated.

The native API system 106 may include any computer-based or hardware-based computing system. The native API system 106 may be configured to communicate with the components of the operating environment 100 (e.g., 102, 104, 110, and 112) via the network 108. The native API system 106 may include a system or device with which a particular API is configured to interact. For example, the particular API may be configured to extract specific information from the native API system 106. The particular API may be the API that one or more of the generated machine-readable API specifications in the first API repository 102 and/or the second API repository 104 are directed to.

The computing device 112 may include a computer-based hardware device that includes a processor, memory, and communication capabilities. The computing device 112 may be coupled to the network 108 to communicate data with one or more of the other components of the operating environment 100 (e.g., 102, 104, 106, and 110). Some examples of the computing device 112 may include a mobile phone, a smartphone, a tablet computer, a laptop computer, or a desktop computer, etc. The computing device 112 may include a processor-based computing device. For example, the computing device 112 may include a hardware server or another processor-based computing device configured to function as a server.

The computing device 112 may include an API specification module 114 and a data storage 116. The data storage 116 may be configured to store data.

The API specification module 114 may be configured to consolidate machine-readable API specifications in the operating environment 100. The API specification module 114 and one or more components or modules thereof described throughout the present disclosure may be implemented using hardware including a processor, a microprocessor (e.g., to perform or control performance of one or more operations), a field-programmable gate array (FPGA), or an application-specific integrated circuit (ASIC). In some other instances, the API specification module 114 may be implemented using a combination of hardware and software. Implementation in software may include rapid activation and deactivation of one or more transistors or transistor elements such as may be included in hardware of a computing system (e.g., the computing device 112). Additionally, software defined instructions may operate on information within the transistor elements. Implementation of the software instructions may at least temporarily reconfigure electronic pathways and transform computing hardware.

The API specification module 114 may be configured to access or receive the machine-readable API specifications from the first API repository 102 and the second API repository 104. Additionally, the API specifications received from the first API repository 102 and the second API repository 104 may be stored at least temporarily in the data storage 116. The API specifications may describe similar APIs using different repository-specific formats. In some embodiments, the API specifications may include one or more API objects, API parameters, API criteria, or combinations thereof. The API specification module 114 may use the API objects, API parameters, and API criteria to consolidate and to validate the API specifications into a consolidated API specification.

In some embodiments, the API specification module 114 may use the API criteria to determine whether the API specifications are directed to the similar API. For example, one or more of the API criteria from each of the received API specifications may be edited to remove the repository specific formatting. If the edited API criteria are identical, the API specifications may be directed to the similar API. If the edited API criteria are not identical, the API specifications may not be directed to the similar API.

In response to the API specifications being directed to the similar API, the API specification module 114 may determine whether the API objects and/or the API parameters in the API specifications are to be combined into consolidated API objects. Additionally, the API specification module 114 may determine if the API specifications include uncommon API objects. For example, the API specification module 114 may determine whether API objects are directed to the same function and/or include common API parameters. In response to the API objects being directed to the same function and/or including common API parameters, the API specification module 114 may consolidate the API parameters included in the API objects into the one or more consolidated API objects.

Additionally, the API specification module 114 may collect API objects that are included in a single API specification as uncommon API objects. The uncommon API objects may be API objects that are not directed to the same function as another API object in a different API specification. For example, an API object included in a first API specification that is not directed to the same function as any of the API objects in a second API specification may be an uncommon API object.

The API specification module 114 may generate the consolidated API specification to include the consolidated API objects and the uncommon API objects. In some embodiments, the consolidated API specification may be machine-readable. Additionally, the consolidated API specification may include a description of the API parameters of the consolidated API objects and/or the uncommon API objects.

The API specification module 114 may determine whether an inconsistency is present in one or more of the consolidated API objects in the consolidated API specification (e.g. whether the consolidated API specification includes one or more inconsistent, consolidated API objects). For example, the API specification module 114 may determine whether one or more of the consolidated API objects include a conceptual and/or a technical inconsistency. As another example, the API specification module 114 may determine whether one or more of the consolidated API objects include a difference in description of the API parameters.

In some embodiments, the API specification module 114 may be configured to access or receive the crowd-source API specifications from the crowd-source API repository 110. The crowd-source API specifications may be stored at least temporarily in the data storage 116. In these and other embodiments, the API specification module 114 may be configured to resolve the inconsistency of the inconsistent consolidated API objects. Resolution of the inconsistent consolidated API objects may include comparing the inconsistent consolidated API objects to related API objects included in the crowd-source API specifications. Additionally, resolution of the inconsistent consolidated API objects may include adding response information from the related API objects in the crowd-source API specifications to the inconsistent consolidated API objects.

In some embodiments, the API specification module 114 may validate the inconsistent consolidated objects. Validation of the inconsistent consolidated API objects may include communicating a request to the native API system 106 using the API parameters of the inconsistent consolidated API objects. Additionally, the validation of the inconsistent consolidated API objects may include comparing a response from the native API system 106 to response information from the related API objects. In some embodiments, the validation of the inconsistent consolidated API objects may verify whether an endpoint for the inconsistent, consolidated API objects are the same as or similar to the endpoint for the related API objects.

Accordingly, the API specification module 114 may receive API specifications, which may include different repository specification formatting. The API specification module 114 may edit one or more API criteria of the API specifications to determine whether the API specifications are directed to the similar API that performs the same functions relative to the native API system 106. Responsive to the API specifications being directed to the similar API, the API specification module 114 may generate a consolidated API specification that includes one or more consolidated API objects. Additionally, the API specification module 114 may validate the consolidated API specification.

Modifications, additions, or omissions may be made to the operating environment 100 without departing from the scope of the present disclosure. For example, the operating environment 100 may include one or more first API repositories 102, one or more second API repositories 104, one or more native API systems 106, one or more crowd-source API repositories 110, one or more computing devices 112 including one or more API specification modules 114 therein, or any combination thereof. Moreover, the separation of various components and servers in the embodiments described in the present disclosure are not meant to indicate that the separation occurs in all embodiments. For example, the first API repository 102 or the second API repository 104 may be integrated with the crowd-source API repository 110. Moreover, it may be understood with the benefit of this disclosure that the described components and servers may generally be integrated together in a single component or server or separated into multiple components or servers.

Figure 2:
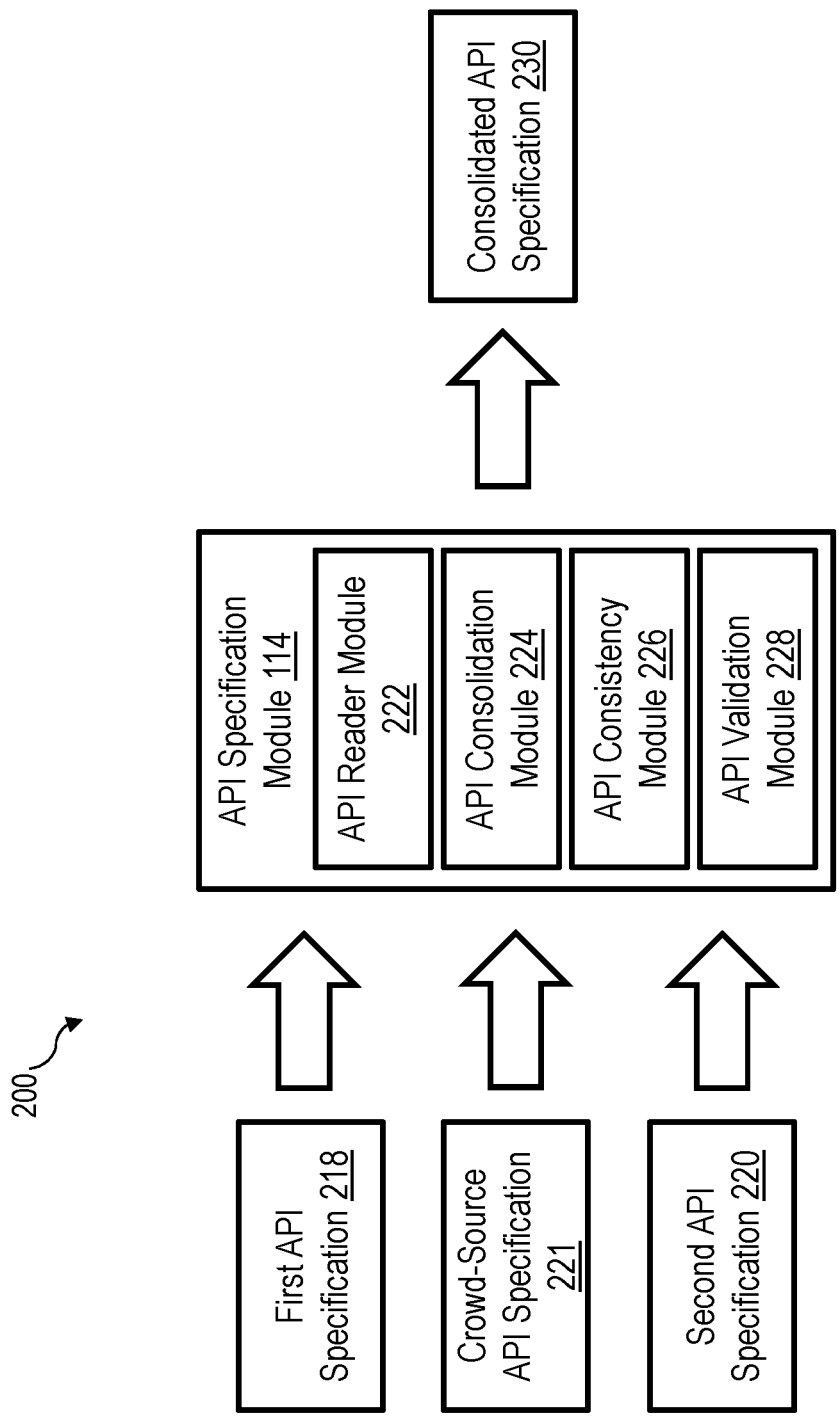
FIG. 2 illustrates a block diagram of an example API specification consolidation process that may be implemented in the operating environment of FIG. 1.

FIG. 2 illustrates a block diagram of an example API specification consolidation process 200 that may be implemented in the operating environment 100 of FIG. 1. The consolidation process 200 may be implemented by the API specification module 114 of FIG. 1. The API specification module 114 may be configured to generate a consolidated API specification 230 using a first API specification 218 and a second API specification 220. Additionally, the API specification module 114 may be configured to validate the consolidated API specification 230 using a crowd-source API specification 221.

The API specification module 114 may include an API reader module 222, an API consolidation module 224, an API consistency module 226, and an API validation module 228. Additionally, the first API specification 218 and the second API specification 220 may be the same as or similar to the API specifications discussed above in relation to FIG. 1. Also, the consolidated API specification 230 may be the same as or similar to the consolidated API specification discussed above in relation to FIG. 1.

The API specification module 114 may receive the first API specification 218 and the second API specification 220. Additionally, the API specification module 114 may be configured to receive the crowd-source API specification 221. The first API specification 218 and the second API specification 220 may be machine-readable API specifications. In some embodiments, the first API specification 218 and the second API specification 220 may describe a similar API according to different repository-specific formats.

In some embodiments, the first API specification may be a source API specification or a target API specification. A source API specification may include API objects and API criteria that are to be compared with API objects and API criteria included in a target API specification. Additionally, the one or more of the API objects of the source API specification may be combined with one or more of the API objects included in the target API specification. In these and other embodiments, the second API specification may be the alternative API specification type of the first API specification. For example, in some embodiments, the first API specification may be a source API specification and the second API specification may be a target API specification. As another example, in some embodiments, the first API specification may be a target API specification and the second API specification may be a source API specification.

In some embodiments, the API criteria of the first API specification 218 and the second API specification 220 may include a title, a Host, a Basepath, an endpoint or combinations thereof for the first API specification 218 and/or the second API specification 220. Additionally, the first API specification 218 and the second API specification 220 may include the API objects and/or the API parameters according to different Open-API specification (OAS) formats. Furthermore, the first API specification 218 and the second API specification 220 may include repository-specific formatting as discussed elsewhere in the present disclosure.

In some embodiments, the API objects (generally referred to in the present disclosure as "objects") may include the API parameters (generally referred to in the present disclosure as "parameters"). The objects and the parameters may describe aspects of the similar API. In these and other embodiments, the first API specification 218 and the second API specification 220 may include common objects and uncommon objects. The common objects may be objects that are directed to the same or similar function. The uncommon objects may be objects that are included either in the first API specification 218 or the second API specification 220 but not both. For example, an uncommon object may include a dictionary object that is included in the first API specification 218 but not the second API specification.

The objects may include JavaScript™ object notation (JSON) objects or another appropriate object format or object type. The parameters may be associated with the objects. Examples of the parameters may include a key parameter, a value parameter, a list parameter, a string parameter, or another appropriate parameter.

In some embodiments, object labels or parameter labels of the objects directed to the same function may be different. For example, a first object label of a first object may include additional information in the first API specification 218 compared to a second object label of the first object directed to the similar function in the second API specification 220. As another example, one or more parameters may include additional blank spaces, alphanumeric characters, etc., in the first API specification 218 compared to the same parameters in the second API specification 220.

Figure 13A:
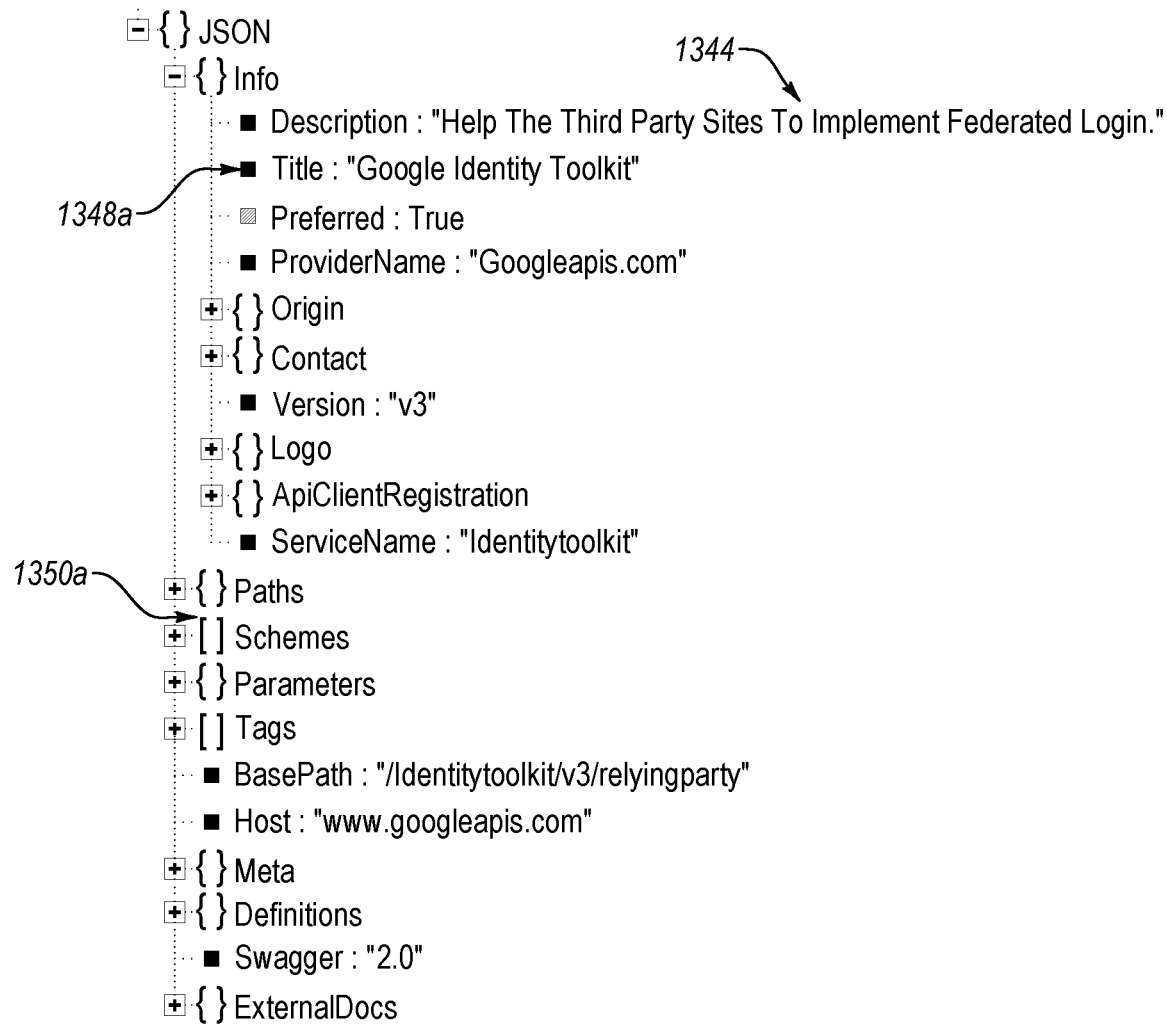

Referring to FIGS. 13A-13B, example machine-readable API specifications 1344 and 1346 are illustrated that may be implemented in the operating environment 100 of FIG. 1. The API specifications 1344 and 1346 may include a first API specification 1344 and a second API specification 1346. The first API specification 1344 may include repository specific formatting of various objects and/or API criteria that is different than the repository format of the second API specification 1346. The first API specification 1344 may be the same as or similar to the first API specification 218 of FIG. 2. The second API specification 1346 may be the same as or similar to the second API specification 220 of FIG. 2.

The API specifications 1344 and 1346 may include string objects 1348a-1348b, list objects 1350a-1350b, and/or dictionary objects 1356a-1356b. In FIGS. 13A-13B, single instances of the string objects 1348a-1348b, the list objects 1350a-1350b, and the dictionary objects 1356a-1356b are numbered and described in both the first API specification 1344 and the second API specification 1346 for simplicity of discussion.

The API specifications 1344 and 1346 may include common objects that are to be consolidated into a consolidated object. For example, a first string object 1348a may include a string parameter of "Google Identity Toolkit" and a second string object may include a string parameter of "Google Identity Toolkit." The first string object 1348a and the second string object 1348b may be identical. A consolidated object generated based on the first string object 1348a and the second string object 1348b may include the string parameter from either the first string object 1348a or the second string object 1348b since they are identical.

As another example, a first list object 1350a may include a list parameter of "schemes" and a second list object 1350b may include a list parameter of "schemes." The first list object 1350a and the second list object 1350b may be identical. A consolidated object generated based on the first list object 1350a and the second list object 1350b may include the list parameter from either the first list object 1350a or the second list object 1350b since they are identical.

Referring back to FIG. 2, in some embodiments, the API reader module 222 may be configured to identify the API criteria of the first API specification 218 and the second API specification 220. The API reader module 222 may determine whether the API criteria are both directed to the similar API. For example, the API reader module 222 may determine whether the first API specification 218 and the second API specification 220 include the same edited title, edited Host, edited Basepath, edited endpoint, or any combination thereof.

The API reader module 222 may edit the API criteria that are being compared. For instance, the API reader module 222 may be configured to remove the repository-specific formatting. An example of removal of the repository-specific formatting from the API criteria is discussed in relation to FIG. 5. The API reader module 222 may compare the edited API criteria to determine whether the first API specification 218 and the second API specification 220 are directed to the similar API. For example, the API reader module 222 may determine whether the edited API criteria are identical. If the edited API criteria are identical, the first API specification 218 and the second API specification 220 may be directed to the similar API. If the edited API criteria are not identical, the first API specification 218 and the second API specification 220 may not be directed to the similar API.

The API reader module 222 may determine whether the first API specification 218 and the second API specification 220 are valid API specifications. For example, the API reader module 222 may determine whether the first API specification 218 and the second API specification 220 include one or more required objects. The required objects may include an information object that provides metadata about the APIs that the first API specification 218 and the second API specification 220 are directed to, a paths object that includes a relative path of individual endpoints for the APIs and functions for the endpoints, and/or a swagger object that specifies a swagger version being used in the first API specification 218 and the second API specification 220.

In some embodiments, in response to the first API specification 218 and the second API specification 220 being valid and directed to the similar API, the API consolidation module 224 may identify a first object in the first API specification 218 and a second object in the second API specification 220. The identified objects in the first API specification 218 and the second API specification 220 may then be compared.

In some embodiments, the API consolidation module 224 may classify an object type of the first object and the object type of the second object. For example, the first object and/or the second object may be classified as dictionary type, list type, or string type objects. Dictionary type objects may include objects with a pair of key parameter and value parameters. List type objects may include a set of objects. String type objects may include an object with string data type.

The API consolidation module 224 may also identify parameters associated with the first object and the second object to compare. The API consolidation module 224 may compare the first object to the second object to determine whether the parameters in the first object and the second object are to be associated in the consolidated object.

The API consolidation module 224 may associate the parameters of the first object and the second object in the consolidated object based on the object type of the first object and the second object. For example, if the first object is a dictionary object and the second object is also a dictionary object, the parameters may be associated in the consolidated object according to a method of dictionary object consolidation. The method of dictionary object consolidation is discussed in more detail below in relation to FIG. 7. As another example, if the first object is a list object and the second object is also a list object, the various parameters may be associated in the consolidated object according to a method of list object consolidation. The method of list object consolidation is discussed in more detail below in relation to FIG. 8. As yet another example, if the first object is a string object and the second object is also a string object, the various parameters may be associated in the consolidated object according to a method of string object consolidation. An example of the method of string object consolidation is discussed in more detail below in relation to FIG. 9. As another example, if the first object is a dictionary object and the second object is a list object, the various parameters may be associated in the consolidated object according to a method of dictionary object and a list object consolidation. The method of the dictionary object and a list object consolidation is discussed in more detail below in relation to FIG. 10. Additionally, the first object and the second object may be classified as not being able to be consolidated if the first object and the second object do not fit into one of the listed combinations. Alternatively, if the first object and/or the second object are not a dictionary object, a list object, or a string object, the first object and/or the second object may be returned as non-compliant objects.

In some embodiments, if the first object and the second object are classified as not being able to be consolidated, then the API consolidation module 224 may identify a third object in the second API specification 220 to compare to the first object and/or the second object. The API consolidation module 224 may also identify the parameters associated with the third object to compare. Additionally, the API consolidation module 224 may classify an object type of the third object. The API consolidation module 224 may associate parameters in the third object and the first object and/or the second object in the consolidated object. The API consolidation module 224 may associate the parameters of the third object and the first object and/or the second object based on the object type of the third object and the first object and/or the second object.

In some embodiments, the API consolidation module 224 may repeat the operations described above until each object in the first API specification 218 and the second API specification 220 have been compared with another object, consolidated with another object, classified as an uncommon object, or classified as a non-compliant object.

In some embodiments, the API consolidation module 224 may generate the consolidated API specification 230. The consolidated API specification 230 may include each of the consolidated objects and the uncommon objects from the first API specification 218 and the second API specification 220.

The API consistency module 226 may determine whether an inconsistency is included in one or more of the consolidated objects of the consolidated API specification 230 (e.g., may determine whether the consolidated API specification 230 includes any inconsistent consolidated objects). The API consistency module 226 may determine whether an inconsistency is included based at least partially on a difference in description of two or more parameters in the consolidated objects. The inconsistent consolidated objects may include technical inconsistencies and/or conceptual inconsistencies.

In some embodiments, conceptual inconsistencies may include inconsistencies in a description of the inconsistent consolidated object, the endpoint of the inconsistent consolidated object, or a website called by the inconsistent consolidated object. In these and other embodiments, technical inconsistencies may include inconsistencies in a host address, a Basepath address, an endpoint object, or a hypertext transfer protocol (HTTP) function object. For example, a consolidated object that includes the parameters of the first object and the second object may include the Basepath address of the first object as "/v2" and the Basepath address of the second object as "/v1." In this example, the inconsistency may include a technical inconsistency. As another example, a consolidated object that includes the parameters of the first object and the second object may include the endpoint object of the first object and the second object as "/get_info," but may include the HTTP function object of the first object as "get" and the HTTP function object of the second object as "delete." In this example, the inconsistency may also include a technical inconsistency.

Additionally or alternatively, the API consistency module 226 may compare each consolidated object to the objects in the crowd-source API specification 221. The API consistency module 226 may determine whether an inconsistency is included if there is a difference between the consolidated objects and the related objects in the crowd-source API specification 221.

If the consolidated objects do not include any inconsistencies, the consolidated API specification 230 may be generated without any additional validation or consistency operations being performed. Alternatively, in some embodiments, if one or more of the consolidated objects include inconsistencies, the API consistency module 226 may update the consolidated object to further include each parameter in the related objects. In some embodiments, if one or more of the consolidated objects include inconsistencies, the API consistency module 226 may update the consolidated object to further include the response information included in the related objects.

In some embodiments, the API validation module 228 may resolve the inconsistencies of the inconsistent consolidated objects. The API validation module 228 may validate each inconsistent consolidated object. In some embodiments, the API validation module 228 may extract the response information from the inconsistent consolidated objects that was obtained from the related objects.

The API validation module 228 may communicate a first request to a native API system using the parameters from the first object in the inconsistent consolidated object. The API validation module 228 may also communicate a second request to the native API system using the parameters from the second object in the inconsistent consolidated object. The API validation module 228 may receive a first response including first response information from the native API system in response to the first request. The API validation module 228 may also receive a second response including second response information from the native API system in response to the second request. The native API system may be the same as or similar to the native API system 106 discussed above in relation to FIG. 1.

The API validation module 228 may compare the first response information and the second response information to the response information in the inconsistent consolidated object. If the first response information and the second response information is the same as or similar to the response information in the consolidated object, the parameters from the first object and the second object may be valid.

For example, if the HTTP function object of the first object is "get" and the HTTP function object of the second object is "delete," then the first request may be sent using "get cloudapi.con/v1/get_info" and the second request may be sent using "delete cloudapi.con/v1/get_info." As another example, if the Basepath address of the first object is "/v2" and the Basepath address of the second object is "/v1," the first request may be sent using "delete cloudapi.con/v2/get_info, get cloudapi.con/v2/get_info, and post api.com/v2/set_info" and the second request may be sent using "delete cloudapi.con/v1/get_info, get cloudapi.con/v1/get_info, and post api.com/v1/set_info."

In some embodiments, if the first response information is not the same as or similar to the response information in the inconsistent consolidated object, then the parameters from the first object may be invalid. In these and other embodiments, if the second response information is not the same as or similar to the response information in the inconsistent consolidated object, then the parameters from the second object may be invalid. If the parameters are invalid, the API validation module 228 may resolve the inconsistency by removing the invalid parameters from the consolidated object.

In some embodiments, the parameters of the inconsistent consolidated object may be determined to be valid or invalid based on a comparison of a majority of the parameters in the inconsistent, consolidated API specification. For example, if the parameters of the first object and the parameters of the related object are the same and the parameters of the second object are different, then the parameters from the second object may be determined to be invalid. The invalid parameters may be removed from the consolidated object. In some embodiments, the consolidated API specification 230 may be generated, which may include the valid consolidated objects and any consolidated objects that did not include the inconsistencies.

In some embodiments, the API validation module 228 may resolve the inconsistencies of the inconsistent consolidated objects (e.g., generate a valid consolidated object). The API validation module 228 may update the inconsistent consolidated objects to include only parameters from the related objects from the crowd-source API specification 221. Additionally, the API validation module 228 may generate a validation model. The validation model may include the parameters from the first object and the second object, the parameters from the related object from the crowd-source API specification 221, the parameters from the valid consolidated object, or some combination thereof.

In some embodiments, the consolidated API specification 230 may be a machine-readable API specification. Additionally the consolidated API specification 230 may be used for additional Web API services such as template creation of API codes, recommendations of API services, comparison of API services, and so on. Consolidating the parameters, the common objects, and the uncommon objects of the first API specification 218 and the second API specification 220 that are formatted according to different repository specific formats into the consolidated API specification 230 may improve functionality of software applications and reduce network traffic due to the consolidated API specification 230 including more API information than any of the first API specification 218, the second API specification 220, or the crowd-source API specification 221 individually. Additionally, consolidating the first API specification 218 and the second API specification 220 into the consolidated API specification 230 without redundant API objects and/or API information, may reduce the amount of memory necessary to store the API information and/or how long it takes to transmit the API information to other devices. Furthermore, software applications, that only use a single API specification, may use the consolidated API specification 230. The software applications using the consolidated API specification 230 may permit the software applications to operate using all of the parameters, common objects, uncommon objects, and other combined in the consolidated API specification 230 rather than just those that are included in a single API specification. Additionally, the software applications using the consolidated API specification 230 may permit the software applications to have access to more functionality of an API, since the consolidated API specification 230 includes more parameters, API objects, and other information than single API specifications.

Figure 3:
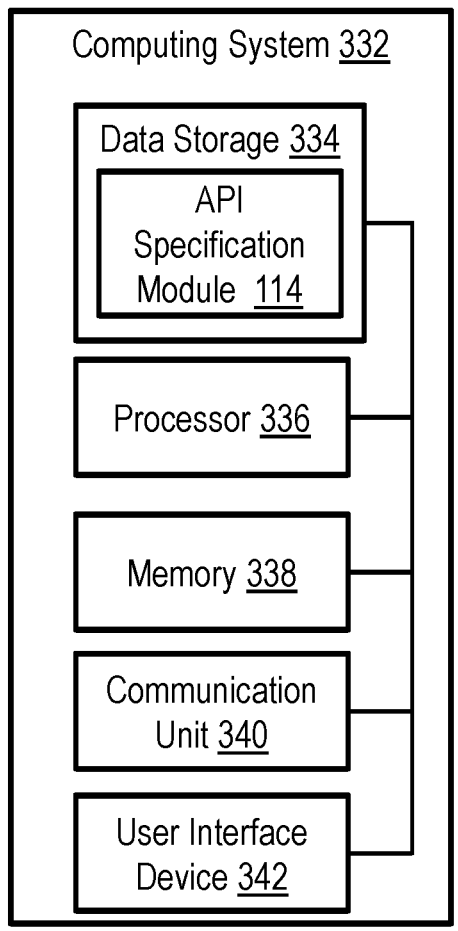
FIG. 3 is a block diagram of an example computing system that is configured for consolidation of similar API specifications.

FIG. 3 is a block diagram of an example computing system 332 that is configured for consolidation of similar API specifications. The computing system 332 may be implemented in the operating environment 100 of FIG. 1. Examples of the computing system 332 may include the computing device 112. The computing system 332 may include one or more processors 336, a memory 338, a communication unit 340, a user interface device 342, and a data storage 334 that includes the API specification module 114.

The processor 336 may include any suitable special-purpose or general-purpose computer, computing entity, or processing device including various computer hardware or software modules and may be configured to execute instructions stored on any applicable computer-readable storage media. For example, the processor 336 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 3, the processor 336 may more generally include any number of processors configured to perform individually or collectively any number of operations described in the present disclosure. Additionally, one or more of the processors 336 may be present on one or more different electronic devices or computing systems. In some embodiments, the processor 336 may interpret and/or execute program instructions and/or process data stored in the memory 338, the data storage 334, or the memory 338 and the data storage 334. In some embodiments, the processor 336 may fetch program instructions from the data storage 334 and load the program instructions in the memory 338. After the program instructions are loaded into the memory 338, the processor 336 may execute the program instructions.

The memory 338 and the data storage 334 may include computer-readable storage media for carrying or having computer-executable instructions or data structures stored thereon. Such computer-readable storage media may include any available media that may be accessed by a general-purpose or special-purpose computer, such as the processor 336. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 336 to perform a certain operation or group of operations.

The communication unit 340 may include one or more pieces of hardware configured to receive and send communications. In some embodiments, the communication unit 340 may include one or more of an antenna, a wired port, and modulation/demodulation hardware, among other communication hardware devices. In particular, the communication unit 340 may be configured to receive a communication from outside the computing system 332 and to present the communication to the processor 336 or to send a communication from the processor 336 to another device or network (e.g., the network 108 of FIG. 1).

The user interface device 342 may include one or more pieces of hardware configured to receive input from and/or provide output to a user. In some embodiments, the user interface device 342 may include one or more of a speaker, a microphone, a display, a keyboard, a touch screen, or a holographic projection, among other hardware devices.

The API specification module 114 may include program instructions stored in the data storage 334. The processor 336 may be configured to load the API specification module 114 into the memory 338 and execute the API specification module 114. Alternatively, the processor 336 may execute the API specification module 114 line-by-line from the data storage 334 without loading them into the memory 338. When executing the API specification module 114, the processor 336 may be configured to perform API consolidation, API consistency verification, and/or API validation to generate consolidated API specifications of API specifications as described elsewhere in this disclosure.

Modifications, additions, or omissions may be made to the computing system 332 without departing from the scope of the present disclosure. For example, in some embodiments, the computing system 332 may not include the user interface device 342. In some embodiments, the different components of the computing system 332 may be physically separate and may be communicatively coupled via any suitable mechanism. For example, the data storage 334 may be part of a storage device that is separate from a server, which includes the processor 336, the memory 338, and the communication unit 340, that is communicatively coupled to the storage device. The embodiments described in the present disclosure may include the use of a special-purpose or general-purpose computer including various computer hardware or software modules, as discussed in greater detail below.

Figure 4:
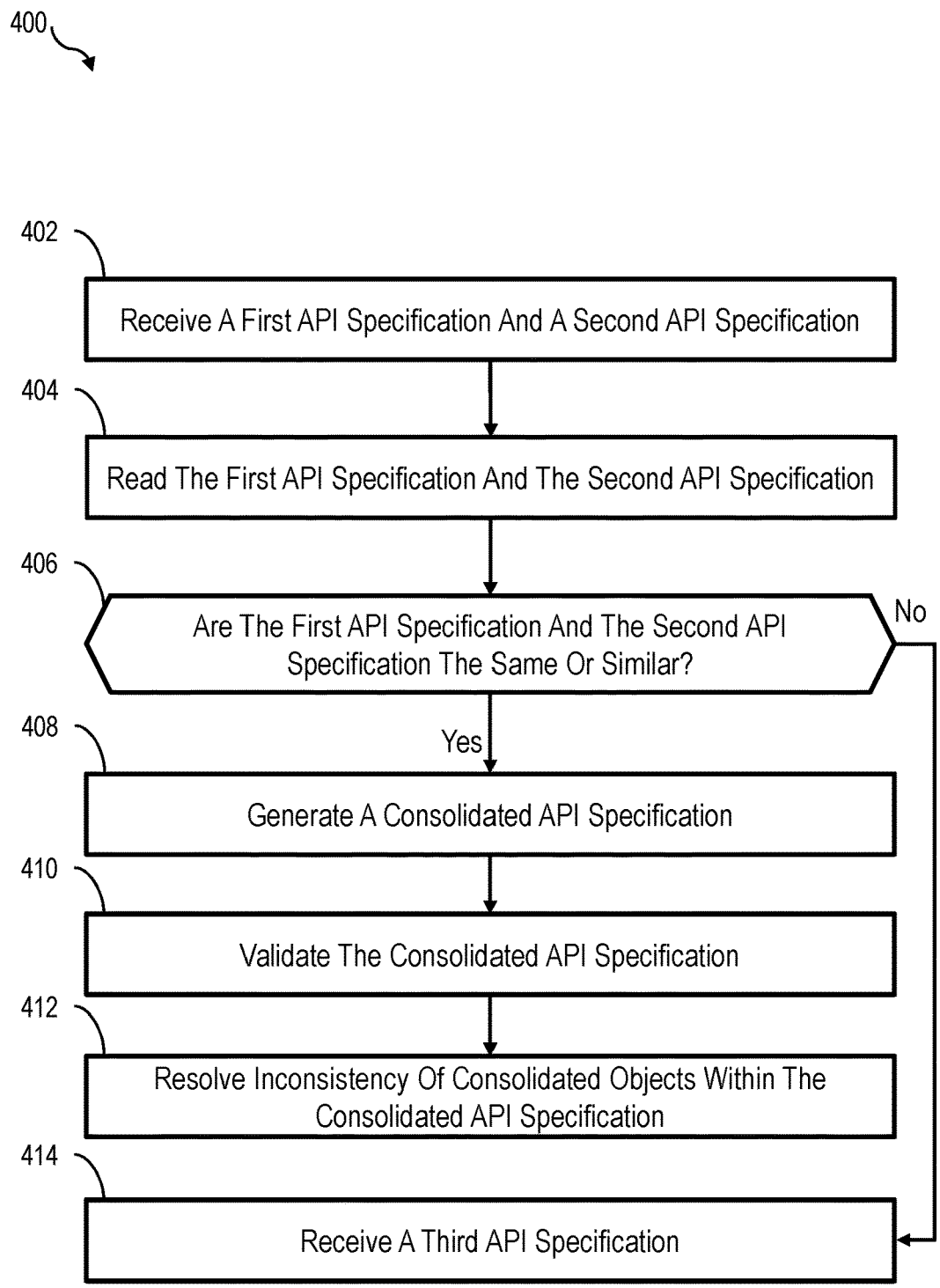
FIG. 4 is a flowchart of an example method of API specification consolidation that may be implemented in the operating environment of FIG. 1.

FIG. 4 is a flowchart of an example method 400 of API specification consolidation that may be implemented in the operating environment 100 of FIG. 1. Although illustrated as discrete blocks, various blocks in FIG. 4 may be divided into additional blocks, combined into fewer blocks, or eliminated, depending on the desired implementation.

The method 400 may begin at block 402 in which a first API specification and a second API specification may be received. The first API specification and the second API specification may describe APIs according to different repository-specific formats. For example, the first API specification may describe an API according to a first repository specific format and the second API specification may describe an API according to a second repository specific format.

The first API specification may be a source API specification or a target API specification. In these and other embodiments, the second API specification may be the alternative API specification type as the first API specification. The source API specification may include objects and parameters that are to be combined with objects and parameters included in the target API specification. The first API specification and the second API specification may be substantially similar to and correspond to the first API specification 218 and the second API specification 220 discussed above in relation to FIG. 2, respectively.

At block 404, the first API specification and the second API specification may be read. In some embodiments, the first API specification and the second API specification may be read to identify individual objects and parameters included in the first API specification and the second API specification. In these and other embodiments, the first API specification and the second API specification may also be read to identify individual API criteria of the first API specification and the second API specification. For example, the first API specification and the second API specification may be read to identify the API criteria such as the title, the Host, the Basepath, the endpoint for the first API specification and the second API specification, or some combination thereof.

At block 406, it may be determined whether the first API specification and the second API specification are the same or similar. The first API specification and the second API specification may be the same or similar if they describe a similar API. In some embodiments, one or more of the API criteria included in the first API specification and the second API specification may be edited to remove the repository specific formatting of the API criteria. Editing the API criteria is discussed in more detail below in relation to FIG. 5. The edited API criteria from the first API specification may be compared to the edited API criteria from the second API specification. If the edited API criteria are identical, it may be determined that the first API specification and the second API specification are the same or similar (e.g., describe the similar API or are directed to the similar API).

In response to the first API specification and the second API specification being the same or similar ("YES" at block 406), the method 400 may proceed to block 408. In response to the first API specification and the second API specification not being the same or similar ("NO" at block 406), the method 400 may proceed to block 414.

At block 408, a consolidated API specification may be generated. The consolidated API specification may include consolidated objects that are generated based on objects that are directed to the same function in the first API specification and the second API specification. Additionally, the consolidated API specification may include uncommon objects from the first API specification and/or the second API specification. The consolidated objects may be generated based on object types of the objects being consolidated. The consolidated API specification may be substantially similar and may correspond to the consolidated API specification 230 of FIG. 2. Consolidation of the objects based on object types is discussed in more detail below in relation to FIGS. 6-10.

At block 410, the consolidated API specification may be validated. In some embodiments, it may be determined whether an inconsistency exists in one or more of the consolidated objects included in the consolidated API specification. The inconsistencies may be identified based on a difference in description of the parameters in the consolidated objects. Additionally or alternatively, the inconsistencies may be identified by comparing the consolidated objects to related objects included in a crowd-source API specification. If inconsistencies are present in one or more of the consolidated objects, the consolidated objects that include inconsistencies may be updated to include response information from the related objects. The crowd-source API specification may be the same as or similar to the crowd-source API specification 221 of FIG. 2.

At block 412, inconsistency of consolidated objects within the consolidated API specification may be resolved. In some embodiments, a native API system may be called using the parameters in the consolidated object that include inconsistencies. In these and other embodiments, a response may be received from the native API system for each object that was consolidated. The responses received from the native API system for each object that was consolidated may include response information. The response information in the responses may be compared to the response information from the crowd-source API specification. If the response information in the responses are the same as or similar to the response information from the crowd-source API specification, the consolidated objects may not include inconsistencies and the consolidated API specification may be generated to include the parameters in the consolidated objects as initially generated. Alternatively, in some embodiments, if the response information in the responses is not the same as or similar to the response information from the crowd-source API specification, the consolidated objects that include the inconsistencies may be updated to include the parameters from the crowd-source API specification. In other embodiments, if the response information in the responses is not the same as or similar to the response information from the crowd-source API specification, the parameters of the consolidated objects that include inconsistencies may be validated and the consolidated API specification may be generated to include a valid consolidated object as discussed elsewhere in the present disclosure.

Additionally, a validation model may be generated. The validation model may include the parameters from the first object and the second object; the parameters from the related object; and the parameters from the valid consolidated object. Additional consolidated objects that include inconsistencies may be compared to the validation model to determine if the validation model includes parameters to correct or update the consolidated objects to resolve the inconsistencies.

At block 414, a third API specification may be received. The operations of the method 400 may be repeated using the third API instead of the first API specification or the second API specification.

Figure 5:
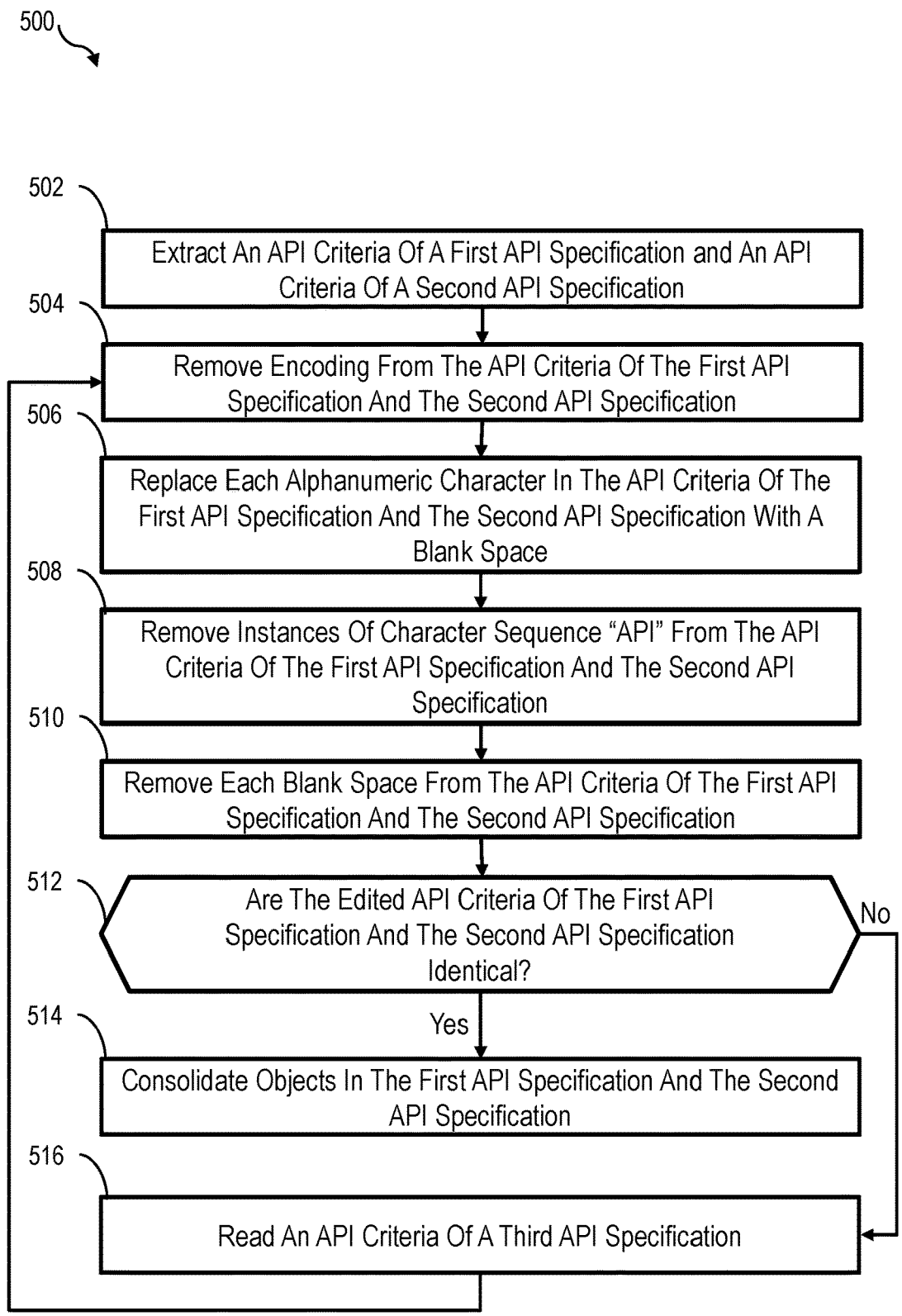
FIG. 5 is a flowchart of an example method of API criteria comparison that may be implemented in the operating environment of FIG. 1.

FIG. 5 is a flowchart of an example method 500 of API criteria comparison that may be implemented in the operating environment 100 of FIG. 1. Although illustrated as discrete blocks, various blocks in FIG. 5 may be divided into additional blocks, combined into fewer blocks, or eliminated, depending on the desired implementation. In some embodiments, the method 500 may be implemented in a step in another method. For example, the method 500 may be implemented as block 406 of the method 400 of FIG. 4.

The method 500 may begin at block 502 in which an API criteria of the first API specification and an API criteria of the second API specification may be extracted. The API criteria may include a title, a Host, a Basepath, or an endpoint for the first API specification and the second API specification. For example, the title of the first API specification may be "API Google Identity Toolkit" and the title of the second API specification may be "Google Identity-Toolkit API." The first API specification and the second API specification may be the same as or similar to the first API specification 218 and the second API specification 220 of FIG. 2.

At block 504, encoding may be removed from the API criteria of the first API specification and the second API specification. In some embodiments, the API criteria may be included in the first API specification and the second API specification in a coded format. The coded format may be removed to obtain the API criteria in a non-encoded format. In some embodiments, the API criteria may be encoded according to Unicode Transformation Format (UTF) or any other appropriate encoding technique.

At block 506, each alphanumeric character in the API criteria of the first API specification and the second API specification may be replaced with a blank space. Alphanumeric characters may include numerals. In some embodiments, the alphanumeric characters may include 0, 1, 2, 3, 4, 5, 6, 7, 8, 9, and/or any combination thereof. In these and other embodiments, the alphanumeric characters may include any character that is not a letter of the alphabet of the language that the first API specification and the second API specification were generated in. For example, the title of the first API specification may be edited to be "api google identity toolkit." The title of the second API specification may be edited to be "google identity toolkit api."

At block 508, instances of character sequence "API" may be removed from the API criteria of the first API specification and the second API specification. In some embodiments, instances of the character sequence "API" may be removed from a start of the API criteria. In other embodiments, the instances of the character sequence "API" may be removed from an end of the API criteria. The instances of the character sequence "API" may include upper case characters, lower case characters, or any combination thereof. For example, the title of the first API specification may be edited to be "google identity toolkit" and the title of the second API specification may be edited to be "google identity toolkit."

At block 510, each blank space may be removed from the API criteria of the first API specification and the second API specification. In some embodiments, the blank spaces may be removed to make the API criteria continuous strings of text. For example, the title of the first API specification may be edited to be "googleidentitytoolkit" and the title of the second API specification may be edited to be "googleidentitytoolkit."

At block 512, it may be determined whether the edited API criteria of the first API specification and the second API specification are identical. In response to the edited API criteria of the first API specification and the second API specification being identical ("YES" at block 512), the method 500 may proceed to block 514. In response to the edited API criteria of the first API specification and the second API specification not being identical ("NO" at block 512), the method 500 may proceed to block 516.

At block 514, objects in the first API specification and the second API specification may be consolidated. The objects may be consolidated based on whether they are directed to a similar function. Additionally, the objects may be consolidated based on object types. Consolidation of the objects based on object types is discussed in more detail below in relation to FIGS. 6-10.

At block 516, an API criteria of a third API specification may be read. The method 500 may proceed to block 504. The method 500 may repeat the operations of blocks 504, 506, 508, 510, 512, and/or 514 using the API criteria of the third API specification.

Figure 6:
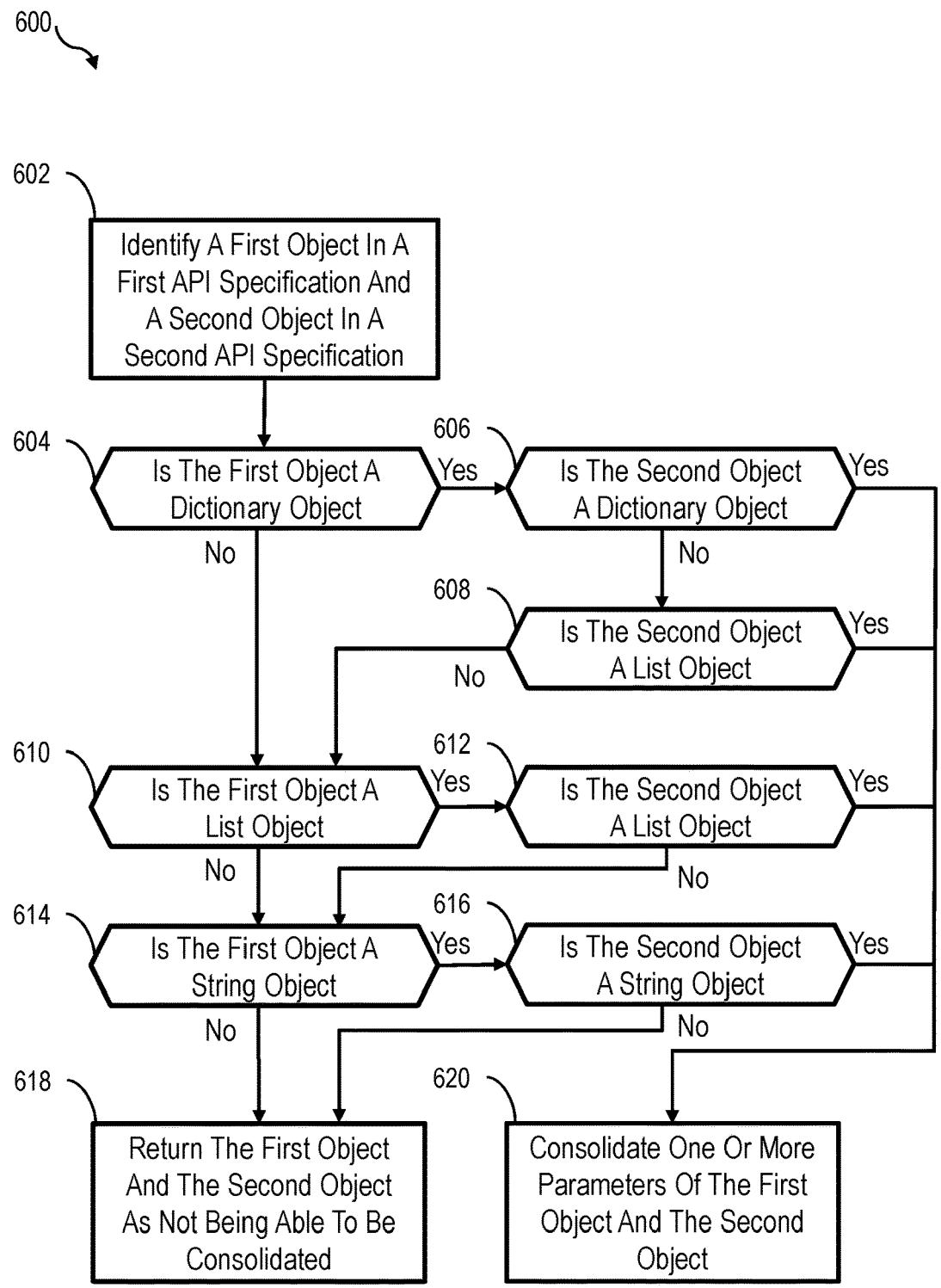
FIG. 6 is a flowchart of an example method of object function determination and consolidation that may be implemented in the operating environment of FIG. 1.

FIG. 6 is a flowchart of an example method 600 of object function determination and consolidation that may be implemented in the operating environment 100 of FIG. 1. Although illustrated as discrete blocks, various blocks in FIG. 6 may be divided into additional blocks, combined into fewer blocks, or eliminated, depending on the desired implementation. In some embodiments, the method 600 may be implemented in a step in another method. For example, the method 600 may be implemented as block 408 of the method 400 of FIG. 4.

The method 600 may begin at block 602 in which a first object in a first API specification and a second object in a second API specification may be identified. The first object and the second object may be compared to determine whether the first object and the second object can be consolidated based on their object types or if they are not able to be consolidated.

At block 604, it may be determined whether the first object is a dictionary object. In some embodiments, it may be determined whether the first object includes a key parameter and a value parameter. For example, it may be determined whether the first object is formatted according to ({"a":1, "b":2, "c":3}), in which "a," "b," and "c" represent different key parameters and 1, 2, and 3 represent different value parameters. In these and other embodiments, the first object may be a dictionary object (e.g., classified as a dictionary object) if the first object includes a key parameter and/or a value parameter. In response to the first object being a dictionary object ("YES" at block 604), the method 600 may proceed to block 606. In response to the first object not being a dictionary object ("NO" at block 604), the method 600 may proceed to block 610.

At block 606, it may be determined whether the second object is a dictionary object. In some embodiments, it may be determined whether the second object includes a key parameter and a value parameter. In these and other embodiments, the second object may be a dictionary object if the second object also includes a key parameter and/or a value parameter. In response to the second object being a dictionary object ("YES" at block 606), the method 600 may proceed to block 620. In response to the second object not being a dictionary object ("NO" at block 606), the method 600 may proceed to block 608.

At block 608, it may be determined whether the second object is a list object. In some embodiments, it may be determined whether the second object includes a set of objects. For example, it may be determined whether the second object is formatted according to (["a", "b", "c"]), in which "a," "b," and "c" represent a list object that consist of three string objects. In these and other embodiments, the second object may be a list object (e.g., classified as a list object) if the second object includes one or more list parameters. In response to the second object being a list object ("YES" at block 608), the method 600 may proceed to block 620. In response to the second object not being a list object ("NO" at block 608), the method 600 may proceed to block 610.

At block 610, it may be determined whether the first object is a list object. In some embodiments, it may be determined whether the first object includes a set of objects. In these and other embodiments, the first object may be a list object if the first object includes one or more list parameters. In response to the first object being a list object ("YES" at block 610), the method 600 may proceed to block 612. In response to the first object not being a list object ("NO" at block 610), the method 600 may proceed to block 614.

At block 612, it may be determined whether the second object is a list object. In some embodiments, it may be determined whether the second object includes a set of objects. In these and other embodiments, the second object may be a list object if the second object includes one or more list parameters. In response to the second object being a list object ("YES" at block 612), the method 600 may proceed to block 620. In response to the second object not being a list object ("NO" at block 612), the method 600 may proceed to block 614.

At block 614, it may be determined whether the first object is a string object. In some embodiments, it may be determined whether the first object includes an object with string data type. For example, it may be determined whether the first object is formatted according to ("abc"), in which "abc" represents an object with string data type. In these and other embodiments, the first object may be a string object (e.g., classified as a string object) if the first object includes a string parameter. In response to the first object being a string object ("YES" at block 614), the method 600 may proceed to block 616. In response to the first object not being a string object ("NO" at block 614), the method 600 may proceed to block 618.

At block 616, it may be determined whether the second object is a string object. In some embodiments, it may be determined whether the second object includes an object with string data type. In these and other embodiments, the second object may be a string object if the second object includes a string parameter. In response to the second object being a string object ("YES" at block 616), the method 600 may proceed to block 620. In response to the second object not being a string object ("NO" at block 616), the method 600 may proceed to block 618.

At block 618, the first object and the second object may be returned as not being able to be consolidated. In some embodiments, the first object and the second object may be invalid objects.

At block 620, one or more parameters of the first object and the second object may be consolidated. In some embodiments, the parameters of the first object and the second object may be consolidated into a consolidated object. The consolidated object may be included as part of a consolidated API specification. Specific operations of consolidating the parameters of the first object and the second object based on object types is discussed in more detail below in relation to FIGS. 7-10.

Figure 7:
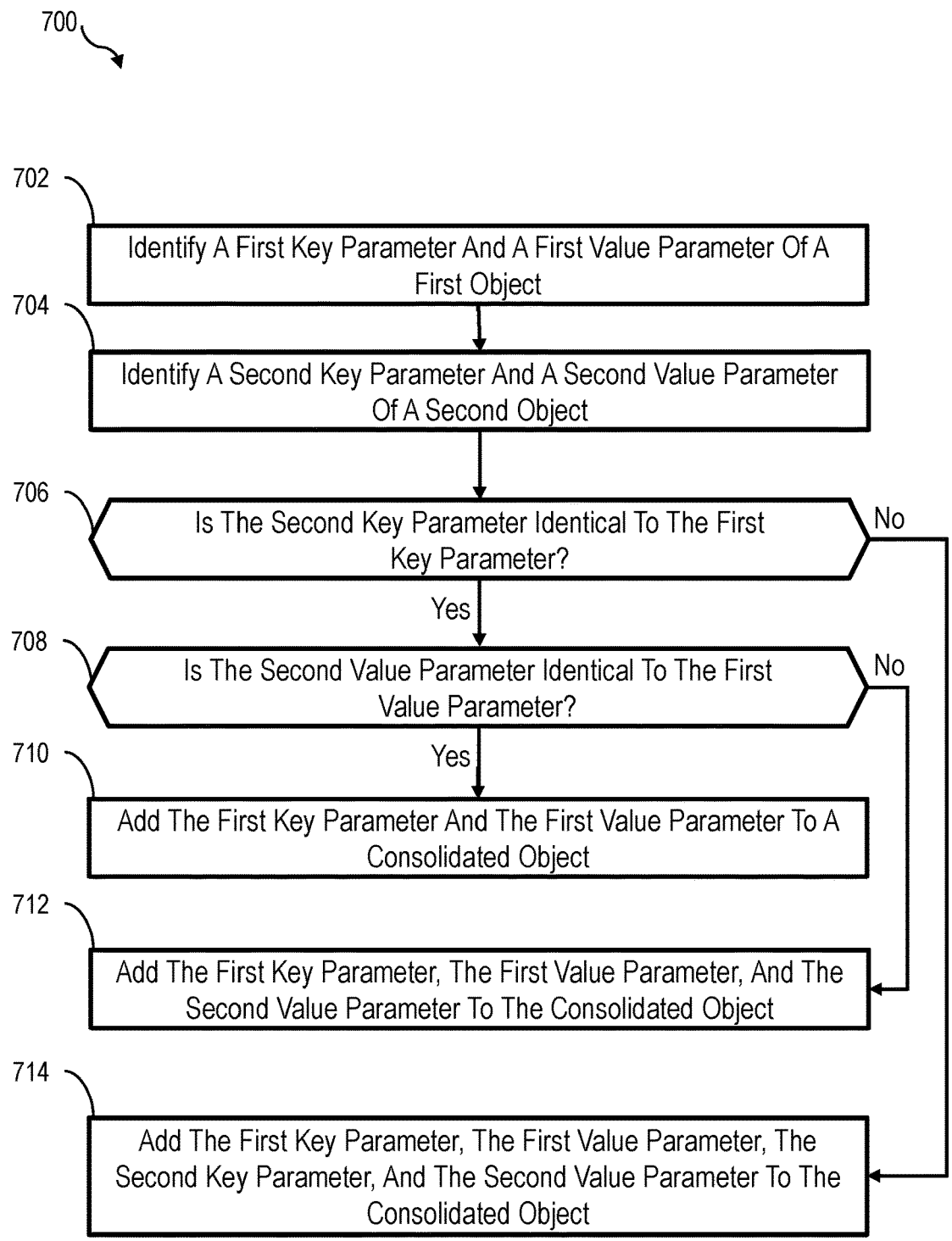
FIG. 7 is a flowchart of an example method of dictionary object consolidation that may be implemented in the operating environment of FIG. 1.

FIG. 7 is a flowchart of an example method 700 of dictionary object consolidation that may be implemented in the operating environment 100 of FIG. 1. Although illustrated as discrete blocks, various blocks in FIG. 7 may be divided into additional blocks, combined into fewer blocks, or eliminated, depending on the desired implementation. In some embodiments, the method 700 may be implemented in a step in another method. For example, the method 700 may be implemented as block 620 of the method 600 of FIG. 6 in response to the first object and the second object being identified as dictionary objects. Additionally, the method 700 may include a dictionary method.

At block 702, a first key parameter and a first value parameter of a first object may be identified. At block 704, a second key parameter and a second value parameter of a second object may be identified.

At block 706, it may be determined whether the second key parameter is identical to the first key parameter. In some embodiments, text of the second key parameter may be compared to text of the first key parameter. In other embodiments, the text of the second key parameter and the text of the first key parameter may be edited to remove repository specific formatting to permit comparison of format free text of the first key parameter and the second key parameter.

In response to the second key parameter being identical to the first key parameter ("YES" at block 706), the method 700 may proceed to block 708. In response to the second key parameter not being identical to the first key parameter ("NO" at block 706), the method 700 may proceed to block 714.

At block 708, it may be determined whether the second value parameter is identical to the first value parameter. In some embodiments, text of the second value parameter may be compared to text of the first value parameter. In other embodiments, the text of the second value parameter and the text of the first value parameter may be edited to remove repository specific formatting to permit comparison of format free text of the first value parameter and the second value parameter.

In response to the second value parameter being identical to the first value parameter ("YES" at block 708), the method 700 may proceed to block 710. In response to the second value parameter not being identical to the first value parameter ("NO" at block 708), the method 700 may proceed to block 712.

At block 710, the first key parameter and the first value parameter may be added to a consolidated object. In some embodiments, the consolidated object may include the same key parameters and value parameters as the first object and the second object since the first object and the second object include the same or similar key parameters and value parameters.

At block 712, the first key parameter, the first value parameter, and the second value parameter may be added to the consolidated object. In some embodiments, the first key parameter may be added to the consolidated object since the first key parameter and the second key parameter are the same or similar. Additionally, the first value parameter and the second value parameter may be added to the consolidated object since the value parameters are different. In these and other embodiments, inclusion of the first value parameter and the second value parameter may permit the consolidated object to be representative of both the first object and the second object.

At block 714, the first key parameter, the first value parameter, the second key parameter, and the second value parameter may be added to the consolidated object. In some embodiments, each of the key parameters and the value parameters may be added to the consolidated object since the first key parameter and the second key parameter are different and the first value parameter and the second value parameter are also different. Additionally, each of the key parameters and the value parameters may be added to permit the consolidated object to be representative of both the first object and the second object.

Figure 8:
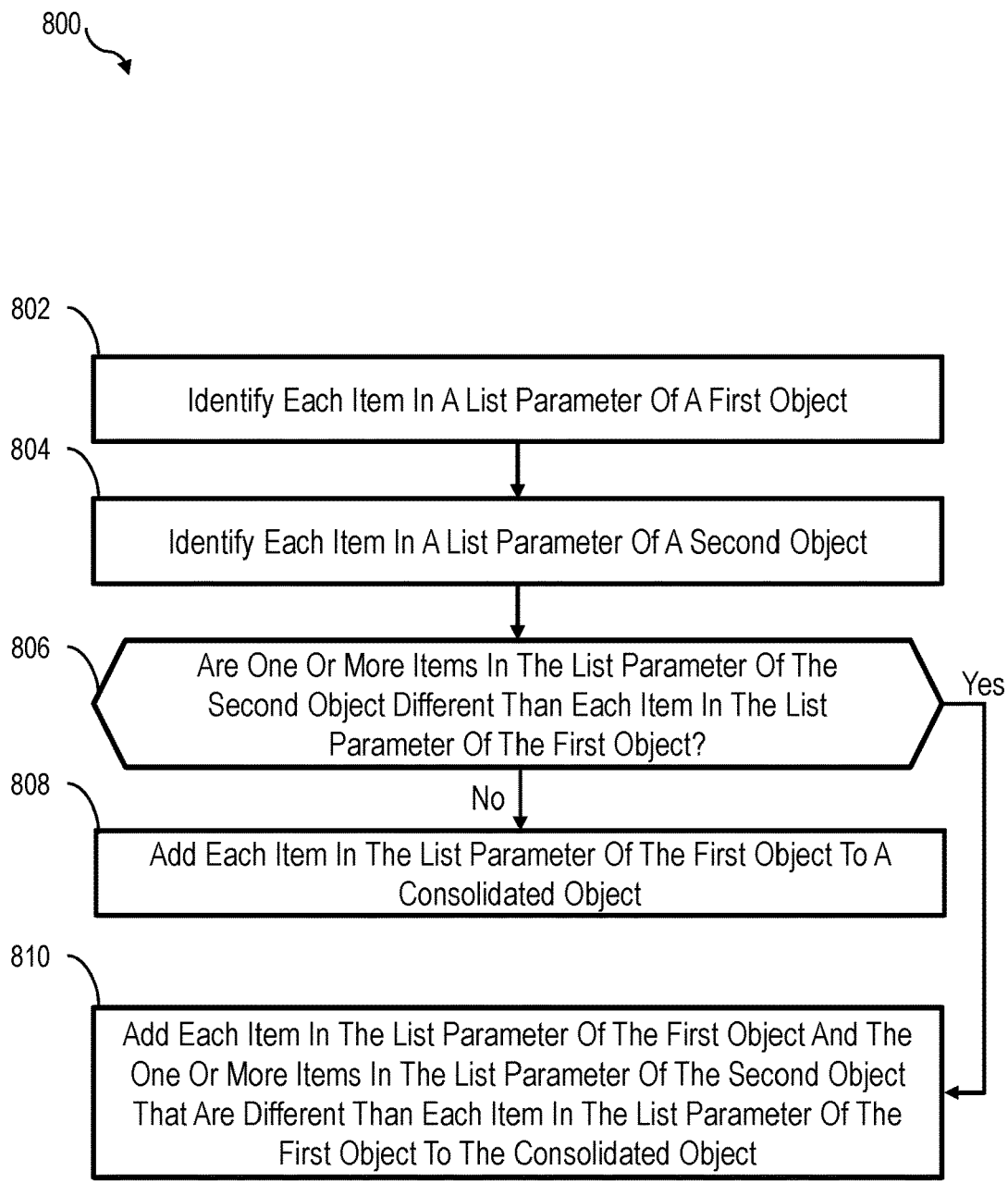
FIG. 8 is a flowchart of an example method of list object consolidation that may be implemented in the operating environment of FIG. 1.

FIG. 8 is a flowchart of an example method 800 of list object consolidation that may be implemented in the operating environment 100 of FIG. 1. Although illustrated as discrete blocks, various blocks in FIG. 8 may be divided into additional blocks, combined into fewer blocks, or eliminated, depending on the desired implementation. In some embodiments, the method 800 may be implemented in a step in another method. For example, the method 800 may be implemented as block 620 of the method 600 of FIG. 6 in response to the first object and the second object being identified as list objects. Additionally, the method 800 may include a list method.

At block 802, each item in a list parameter of a first object may be identified. At block 804, each item in a list parameter of a second object may be identified.

At block 806, it may be determined whether one or more items in the list parameter of the second object are different than each item in the list parameter of the first object. In some embodiments, text of the list parameter of the second object may be compared to text of the list parameter of the first object. In other embodiments, the text of the list parameter of the second object and the text of the list parameter of the first object may be edited to remove repository specific formatting to permit comparison of format free text of the list parameter of the second object and the text of the list parameter of the first object.

In response to one or more items in the list parameter of the second object being different than each item in the list parameter of the first object ("YES" at block 806), the method 800 may proceed to block 808. In response to each item in the list parameter of the second object not being different than the items in the list parameter of the first object ("NO" at block 806), the method 800 may proceed to block 810.

At block 808, each item in the list parameter of the first object may be added to a consolidated object. In some embodiments, the consolidated object may include the list parameter as the first object and the second object since the first object and the second object include the same or similar list parameters.

At block 810, each item in the list parameter of the first object and the one or more items in the list parameter of the second object that are different than each item in the list parameter of the object may be added to the consolidated object. In some embodiments, the one or more items in the list parameters of the second object may be added to the consolidated object along with each item in the list parameter of the first object to permit the consolidated object to include different items of the first object and the second object.

Figure 9:
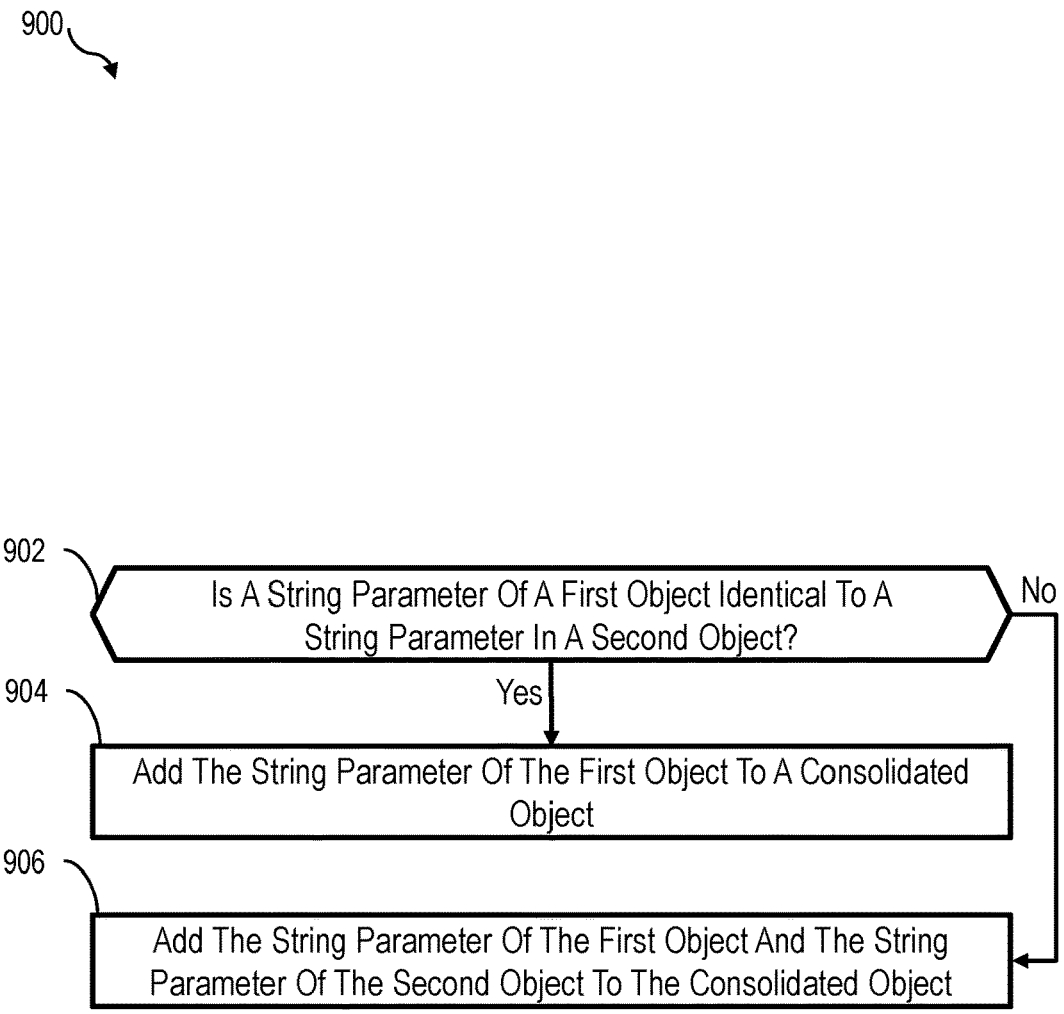
FIG. 9 is a flowchart of an example method of string object consolidation that may be implemented in the operating environment of FIG. 1.

FIG. 9 is a flowchart of an example method 900 of string object consolidation that may be implemented in the operating environment 100 of FIG. 1. Although illustrated as discrete blocks, various blocks in FIG. 9 may be divided into additional blocks, combined into fewer blocks, or eliminated, depending on the desired implementation. In some embodiments, the method 900 may be implemented in a step in another method. For example, the method 900 may be implemented as block 620 of the method 600 of FIG. 6 in response to the first object and the second object being string objects. Additionally, the method 900 may include a string method.

At block 902, it may be determined whether a string parameter of a first object is identical to a string parameter of a second object. In some embodiments, text of the string parameter of the second object may be compared to text of the string parameter of the first object. In other embodiments, the text of the string parameter of the second object and the text of the string parameter of the first object may be edited to remove repository specific formatting to permit comparison of format free text of the string parameter of the second object and the text of the string parameter of the first object.

In response to the string parameter of the first object being identical to the string parameter of the second object ("YES" at block 902), the method 900 may proceed to block 904. In response to the string parameter of the first object not being identical to the string parameter of the second object ("NO" at block 902), the method 900 may proceed to block 906.

At block 904, the string parameter of the first object may be added to a consolidated object. In some embodiments, the consolidated object may include the same string parameter as the first object and the second object since the first object and the second object include identical string parameters.

At block 906, the string parameter of the first object and the string parameter of the second object may be added to the consolidated object. In some embodiments, the string parameter of the second object may be added to the consolidated object along with the string parameter of the first object to permit the consolidated object to be representative of both the first object and the second object. Additionally, the string parameter of the second object may be added to the consolidated object along with the string parameter of the first object in a dictionary order. In some embodiments, adding objects in a dictionary order may include adding the objects in sequential order. For example, if the first object is added first and the second object is added second, the first object may appear first and the second object may appear second in the consolidated object. As another example, if the second object is added first and the first object is added second, the second object may appear first and the first object may appear second in the consolidated object. As yet another example, if the parameter from the first object (e.g., first instruction) to be added is a key parameter that includes "dict["a"]=1" and the parameters from the second object (e.g., second instruction) is a key parameter and value parameter pair that includes "dict["b"]=2", the consolidated object may include {"a":1, "b":2}.

Figure 10:
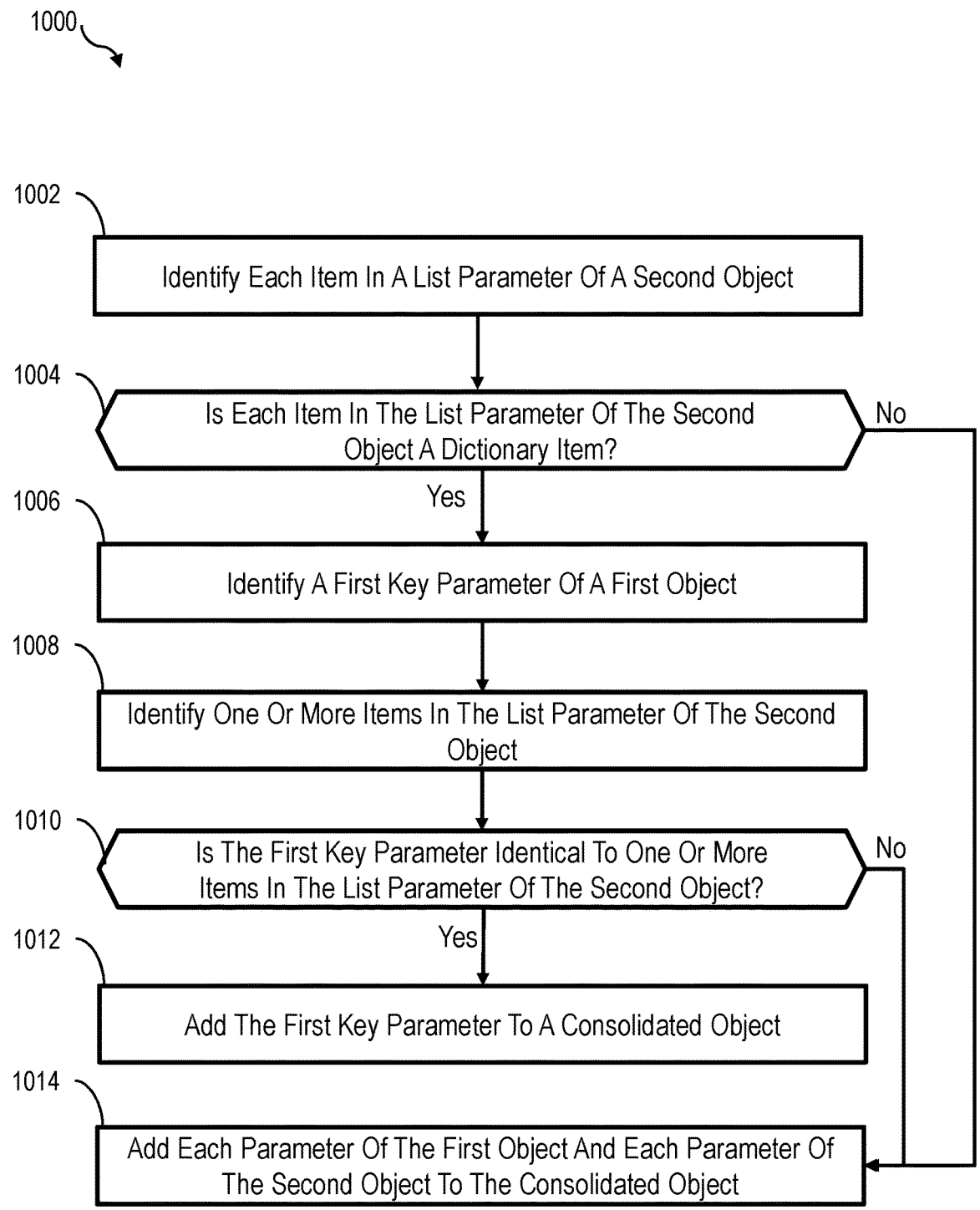
FIG. 10 is a flowchart of an example method of dictionary object and a list object consolidation that may be implemented in the operating environment of FIG. 1.

FIG. 10 is a flowchart of an example method 1000 of dictionary object and a list object consolidation that may be implemented in the operating environment 100 of FIG. 1. Although illustrated as discrete blocks, various blocks in FIG. 10 may be divided into additional blocks, combined into fewer blocks, or eliminated, depending on the desired implementation. In some embodiments, the method 1000 may be implemented in a step in another method. For example, the method 1000 may be implemented as block 620 of the method 600 of FIG. 6. Additionally, the method 1000 may include a dictionary list method.

At block 1002, each item in a list parameter of a second object may be identified. At block 1004, it may be determined whether each item in the list parameter of the second object is a dictionary item. In some embodiments, it may be determined whether each item in the list parameter of the second object includes a key parameter and a value parameter. In response to each item in the list parameter of the second object being a dictionary item ("YES" at block 1004), the method 1000 may proceed to block 1006. In response to each item in the list parameter of the second object not being a dictionary item ("NO" at block 1004), the method 1000 may proceed to block 1014.

At block 1006, a first key parameter of a first object may be identified. In some embodiments, if the first object is a list object or a dictionary object, the first object may be parsed. For example, if the first object is a dictionary object that includes {"a":1, "b":2, "c": [7,8] }, parsing may return, in order, the first key parameter of ""a", value1, type of value: integer," a second key parameter of ""b", value:2, type of value: integer," and a third key parameter of ""c", value: [7,8], type of value: list (a list of integers)." At block 1008, one or more items in the list parameter of the second object may be identified. In some embodiments, if the second object is a list object or a dictionary object, the second object may be parsed.

At block 1010, it may be determined whether the first key parameter is identical to one or more items in the list parameter of the second object. In response to the first key parameter being identical to one or more items in the list parameter of the second object ("YES" at block 1010), the method 1000 may proceed to block 1012. In response to the first key parameter not being identical to one or more items in the list parameter of the second object ("NO" at block 1010), the method 1000 may proceed to block 1014.

At block 1012, the first key parameter may be added to a consolidated object. In some embodiments, the consolidated object may include the same key parameter as the first object and the second object since the first object and the second object include the same key parameter.

At block 1014, each parameter of the first object and each parameter of the second object may be added to the consolidated object. In some embodiments, each parameter of the first object and each parameter of the second object may be added to the consolidated object to permit the consolidated object to be representative of the first object and the second object.

Figure 11:
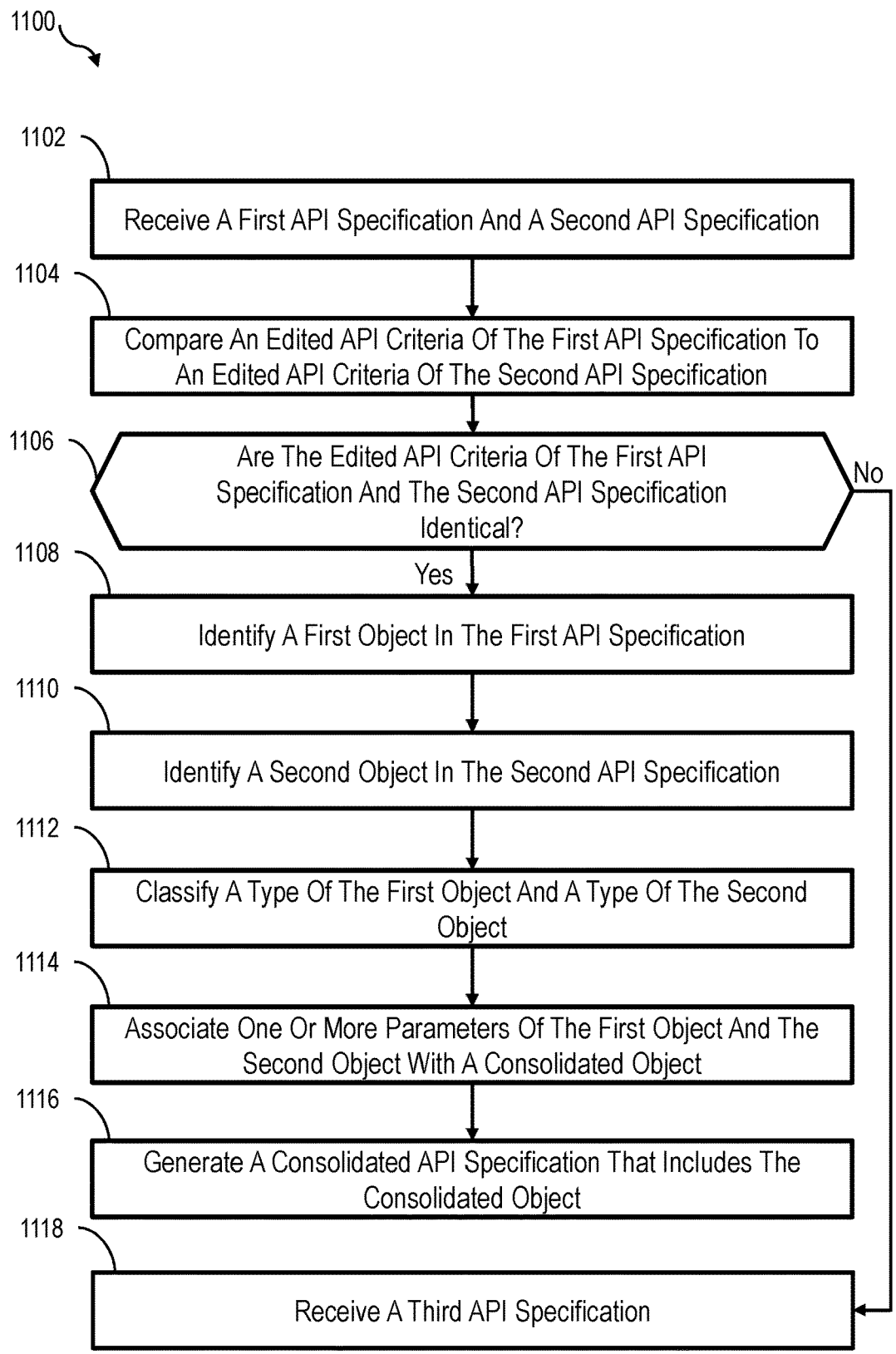
FIG. 11 is another example method of API specification consolidation that may be implemented in the operating environment of FIG. 1.

FIG. 11 is another example method 1100 of API specification consolidation that may be implemented in the operating environment 100 of FIG. 1. Although illustrated as discrete blocks, various blocks in FIG. 11 may be divided into additional blocks, combined into fewer blocks, or eliminated, depending on the desired implementation.

At block 1102, a first API specification and a second API specification may be received. The operations of block 1102 may be the same as or similar to the operations of block 402 of the method 400 discussed above in relation to FIG. 4.

At block 1104, an edited API criteria of the first API specification may be compared to an edited API criteria of the second API specification. In some embodiments, one or more of the API criteria included in the first API specification and the second API specification may be edited to remove repository specific formatting of the API criteria. Editing the API criteria of the first API specification and the second API specification is discussed in more detail above in relation to FIG. 5.

At block 1106, it may be determined whether the edited API criteria of the first API specification and the second API specification are identical. The operations of block 1106 may be the same as or similar to the operations of block 512 of the method 500 discussed above in relation to FIG. 5. In response to the edited API criteria of the first API specification and the second API specification being identical ("YES" at block 1106), the method 1100 may proceed to block 1108. In response to the edited API criteria of the first API specification and the second API specification not being identical ("NO" at block 1106), the method 1100 may proceed to block 1118.

At block 1108, a first object in the first API specification may be identified. The first object may be an object in the first API specification to be compared to other objects to determine whether the objects are directed to the same function. At block 1110, a second object in the second API specification may be identified. The second object may be an object in the second API specification to be compared to the first object to determine whether the first object and the second object are directed to the same function.

At block 1112, a type of the first object and a type of the second object may be classified. In some embodiments, the first object and the second object may include a dictionary object, a list object, or a string object. Classification of the object type of the first object and the second object is discussed in more detail above in relation to FIG. 6.

At block 1114, one or more parameters of the first object and the second object may be associated with a consolidated object. In some embodiments, the one or more parameters of the first object and the second object may be associated with a consolidated object based on object type of the objects. The one or more parameters being associated with the consolidated object (e.g., added to the consolidated object) based on the object type of the objects is discussed in more detail above in relation to FIGS. 6-10.

At block 1116, a consolidated API specification that includes the consolidated object may be generated. In some embodiments, the consolidated API specification may also include uncommon objects from the first API specification and/or the second API specification. The consolidated API specification may be a machine-readable API specification. The consolidated API specification may be the same as or similar to the consolidated API specification 230 of FIG. 2.

At block 1118, a third API specification may be received. The operations of the method 1100 may be repeated using the third API specification instead of the first API specification or the second API specification.

Figure 12:
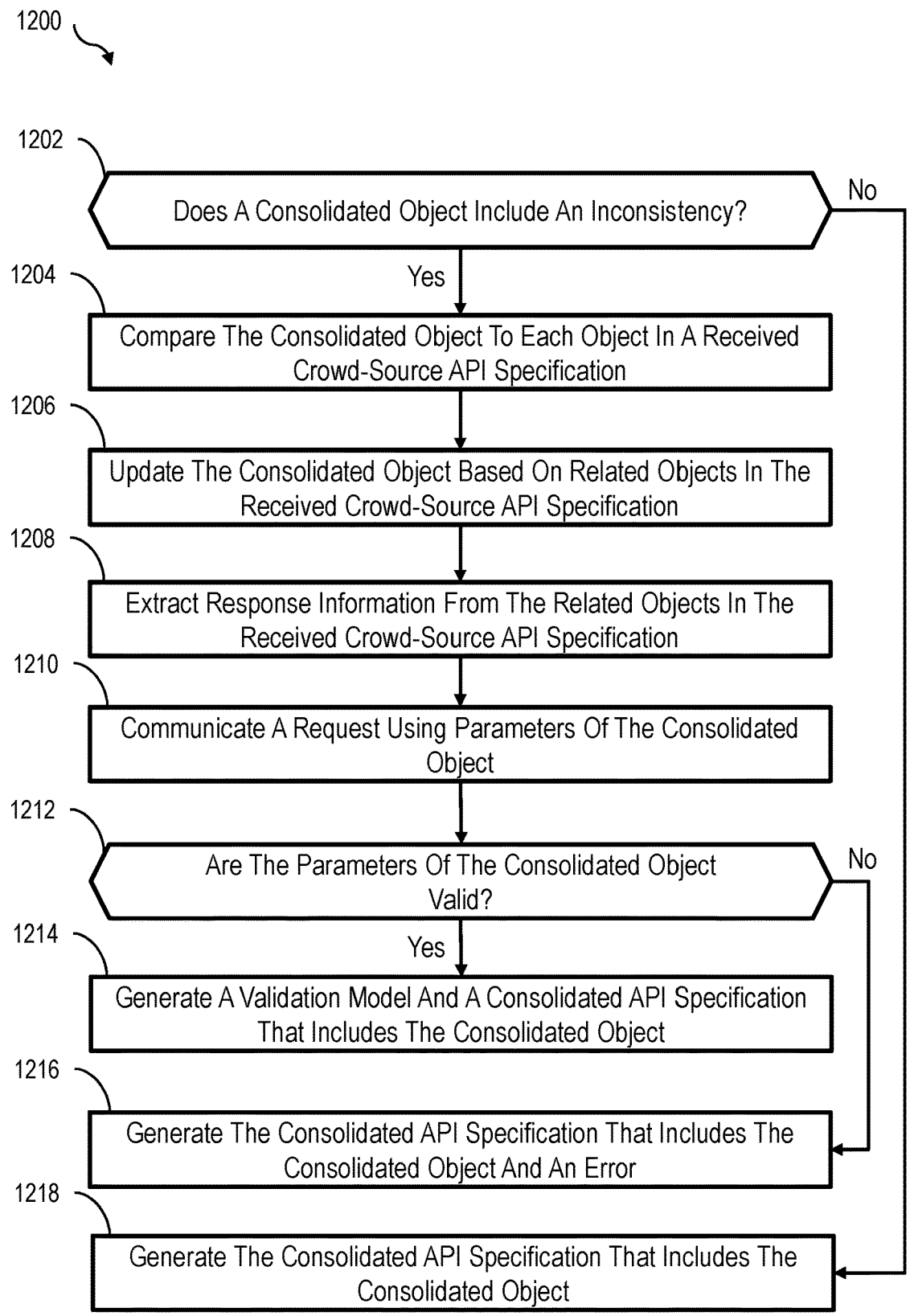
FIG. 12 is an example method of API specification consolidation and API specification validation that may be implemented in the operating environment of FIG. 1.

FIG. 12 is an example method 1200 of API specification consolidation and API specification validation that may be implemented in the operating environment 100 of FIG. 1. Although illustrated as discrete blocks, various blocks in FIG. 12 may be divided into additional blocks, combined into fewer blocks, or eliminated, depending on the desired implementation.

At block 1202, it may be determined whether a consolidated object includes an inconsistency. The consolidated object may be included in a consolidated API specification such as the consolidated API specification 230 of FIG. 2. In some embodiments, the inconsistency may include a conceptual inconsistency and/or a technical inconsistency as discussed elsewhere in the present disclosure. In response to the consolidated object including an inconsistency ("YES" at block 1202), the method 1200 may proceed to block 1204. In response to the consolidated object not including an inconsistency ("NO" at block 1202), the method 1200 may proceed to block 1218.

At block 1204, the consolidated object may be compared to each object in a received crowd-source API specification. The consolidated object may be compared to each object in the received crowd-source API specification to determine if there are one or more objects directed to the same function in the crowd-source API specification. The objects may be directed to the same function if they describe similar functions, call similar endpoints, include similar descriptions, or similar http function objects. The objects in the received crowd-source API specification may include response information. The response information may describe what a response from a correct endpoint may include. The received crowd-source API specification may be the same as or similar to the crowd-source API specification 221 of FIG. 2.

At block 1206, the consolidated object may be updated based on related objects in the received crowd-source API specification. In some embodiments, the consolidated object may be updated to include all of the parameters included in the related objects. For example, the consolidated object may be updated to include the endpoint, the Basepath, the description, and/or the http function object of the related objects.

At block 1208, the response information may be extracted from the similar objects in the received crowd-source API specification. At block 1210, a request may be communicated using the parameters of the consolidated object. In some embodiments, the request may be communicated using the parameters from the object consolidated to generate the consolidated object. Additionally, a response including response information may be received based on the request. In some embodiments, the request may be communicated to a native API system such as the native API system 106 of FIG. 1.

At block 1212, it may be determined whether the parameters of the consolidated object are valid. In some embodiments, the validity of the parameters of the consolidated object may be determined by comparing the response information from the related objects to the response information received based on the request. If the response information from the related objects is the same as or similar to the response information based on the request, the parameters of the consolidated object may be valid. If the response information from the related objects is not the same as or similar to the response information based on the request, the parameters of the consolidated object may not be valid.

In response to the parameters of the consolidated object being valid ("YES" at block 1212), the method 1200 may proceed to block 1214. In response to the parameters of the consolidated object not being valid ("NO" at block 1212), the method 1200 may proceed to block 1218.

At block 1214, a validation model and a consolidated API specification that includes the consolidated object may be generated. In some embodiments, the consolidated API specification may be a machine-readable API specification. The consolidated API specification may be the same as or similar to the consolidated API specification 230 of FIG. 2.

The validation model may be generated to include the information in the consolidated object as valid information. The validation model may be used to resolve inconsistencies that are included in subsequent consolidated objects that are the same as or similar to the inconsistencies in the consolidated object. For example, if an inconsistency was included in the API description of the consolidated object, the validation model may be generated to indicate that the inconsistent API descriptions are valid.

The validation model may permit automated inconsistency detection resolution. The validation model may be a machine learning model that is updated based on multiple consolidated objects (e.g., may be generated by repeating the operations of the method 1200 using multiple consolidated objects). In some embodiments, the validation model may determine what information in the subsequent consolidated objects is valid and/or what information in the subsequent consolidated objects is incorrect. Additionally, the validation model may be generated based on the related objects from the received crowd-source API specification.

In some embodiments, the validation model may use the received crowd-source API specification and statistical results generated by using machine learning techniques such as a support vector machine (SVM) technique to determine parameters are valid in the subsequent consolidated objects. In these and other embodiments, the validation model may be used on the subsequent consolidated objects rather than having to communicate the request to the native API system using the parameters of the consolidated objects.

At block 1216, the consolidated API specification that includes the consolidated object and an error may be generated. The consolidated API specification may include the inconsistent consolidated object including the information from the related object. The consolidated API specification may be the same as or similar to the consolidated API specification 230 of FIG. 2.

At block 1218, the consolidated API specification that includes the consolidated object may be generated. In some embodiments, the consolidated API specification may include the consolidated object. The consolidated API specification may be the same as or similar to the consolidated API specification 230 of FIG. 2.

The methods 400, 500, 600, 700, 800, 900, 1000, 1100, and 1200 may be performed in an operating environment such as the operating environment 100 of FIG. 1. The methods 400, 500, 600, 700, 800, 900, 1000, 1100, and 1200 may be programmably performed in some embodiments by the computing device 112 described with reference to FIG. 1. In some embodiments, the computing device 112 or another computing system may include or may be communicatively coupled to a non-transitory computer-readable medium (e.g., the memory 338 of FIG. 3) having stored thereon programming code or instructions that are executable by one or more processors (such as the processor 336 of FIG. 3) to cause a computing system and/or the computing device 112 to perform or control performance of the methods 400, 500, 600, 700, 800, 900, 1000, 1100, and 1200. Additionally or alternatively, the computing device 112 may include the processor 336 described elsewhere in the present disclosure that is configured to execute computer instructions to cause the computing device 112 or another computing system to perform or control performance of the methods 400, 500, 600, 700, 800, 900, 1000, 1100, and 1200.

The embodiments described in the present disclosure may include the use of a special purpose or general purpose computer including various computer hardware or software modules, as discussed in greater detail below.

Embodiments described in the present disclosure may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in the present disclosure, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of automated consolidated machine-readable API specification generation, the method comprising:
   receiving a first API specification and a second API specification;
   comparing a first API criteria of the first API specification to a second API criteria of the second API specification;
   responsive to the first API criteria being identical to the second API criteria:
      identifying a first object in the first API specification, the first object including one or more parameters;
      identifying a second object in the second API specification, the second object including one or more parameters;
      classifying a type of the first object and a type of the second object;
      associating, based on the type of the first object and the type of the second object, the one or more parameters included in the first object and the one or more parameters included in the second object with a consolidated object;
      in response to associating the one or more parameters included in the first object and the one or more parameters included in the second object with the consolidated object, determining a difference in description of the one or more parameters included in the first object and the one or more parameters included in the second object;
      in response to determining the difference:
         searching a plurality of API specifications for a third API specification related to the one or more parameters included in the first object and the one or more parameters included in the second object;
         identifying a third object in the third API specification related to the one or more parameters included in the first object and the one or more parameters included in the second object; and
         updating the consolidated object to include at least a portion of the third object in the third API specification; and
   generating a consolidated API specification that includes the consolidated object and a description of the one or more parameters of the first object and the one or more parameters of the second object that are associated with the consolidated object in a single API specification.

2. The method of claim 1, further comprising:
   identifying a fourth object in the second API specification, the fourth object including one or more parameters;
   classifying a type of the fourth object; and
   associating, based on the type of the first object and the type of the fourth object, one or more parameters of the first object and the fourth object with the consolidated object.

3. The method of claim 1, wherein the first API specification is received from a first API repository and the second API specification is received from a second API repository.

4. The method of claim 1, further comprising
   validating the consolidated object, the validating including:
      extracting response information from the third object in the third API specification;
      communicating, to a native API system, a request using the consolidated object;
      comparing a response from the native API system with the response information to determine a validity of the consolidated object; and
      responsive to the consolidated object being valid, generating a validation model that includes the third object in the third API specification and the consolidated object.

5. The method of claim 1, further comprising generating the first API criteria, wherein the generating the first API criteria includes:
   extracting an API criteria of the first API specification;
   removing encoding from the API criteria of the first API specification;
   replacing alphanumeric characters in the API criteria of the first API specification with blank spaces;
   removing instances of character sequence "api" from a start and an end of the API criteria of the first API specification; and
   removing blank spaces from the API criteria of the first API specification.

6. The method of claim 1, further comprising, responsive to the first object and the second object being classified as dictionary objects:
   identifying a first key parameter and a first value parameter of the first object;
   identifying a second key parameter and a second value parameter of the second object;
   comparing the first key parameter to the second key parameter;
   responsive to the first key parameter being identical to the second key parameter, comparing the first value parameter with the second value parameter;
      responsive to the first value parameter being identical to the second value parameter the associating includes adding the first key parameter and the first value parameter to the consolidated object; and
      responsive to the first value parameter being different than the second value parameter, the associating includes adding the first key parameter, the first value parameter, and the second value parameter to the consolidated object; and
   responsive to the first key parameter being different than the second key parameter, the associating includes adding the first key parameter, the first value parameter, the second key parameter, and the second value parameter with the consolidated object.

7. The method of claim 1, further comprising, responsive to the first object and the second object being classified as list objects:
   identifying each item in a list parameter of the first object;
   identifying each item in a list parameter of the second object;
   comparing each item in the list parameter of the second object to the items in the list parameter of the first object;
   responsive to one or more items in the list parameter of the second object being different than each item in the list parameter of the first object, the associating includes adding each item in the list parameter of the first object and the one or more items in the list parameter of the second object that are different than each item in the list parameter of the first object to the consolidated object; and
   responsive to each of the items in the list parameter of the second object being identical to one or more items in the list parameter of the first object, the associating includes adding each item in the list parameter of the first object to the consolidated object.

8. The method of claim 1, further comprising, responsive to the first object and the second object being classified as string objects:
   comparing a string parameter in the first object to a string parameter in the second object;
   responsive to the string parameter in the first object being identical to the string parameter in the second object, the associating includes adding the string parameter in the first object to the consolidated object; and
   responsive to the string parameter in the first object being different than the string parameter in the second object, the associating includes adding the string parameter in the first object and the string parameter in the second object to the consolidated object.

9. The method of claim 1, further comprising, responsive to the first object being classified as a dictionary object and the second object being classified as a list object:
   identifying each item in a list parameter of the second object;
   determining whether each item in the list parameter of the second object is a dictionary item;
   responsive to each item in the list parameter of the second object being the dictionary item:
      identifying a first key parameter of the first object;
      comparing the first key parameter to the items in the list parameter of the second object;
      responsive to the first key parameter being identical to one or more items in the list parameter of the second object, the associating includes adding the first key parameter to the consolidated object; and
      responsive to the first key parameter being different than each of the items in the list parameter of the second object, the associating includes adding each parameter in the first object and each parameter in the second object to the consolidated object; and
   responsive to one or more items in the list parameter of the second object being different than a dictionary item, the associating includes adding each parameter in the first object and each parameter in the second object to the consolidated object.

10. The method of claim 1, wherein the third API specification is a crowd-source API specification.

11. A non-transitory computer-readable medium having encoded therein programming code executable by one or more processors to perform or control performance of automated operations comprising:
   receiving a first API specification and a second API specification;
   comparing a first API criteria of the first API specification to a second API criteria of the second API specification;
   responsive to the first API criteria being identical to the second API criteria:
      identifying a first object in the first API specification, the first object including one or more parameters;
      identifying a second object in the second API specification, the second object including one or more parameters;
      classifying a type of the first object and a type of the second object; and
      associating, based on the type of the first object and the type of the second object, the one or more parameters included in the first object and the one or more parameters included in the second object with a consolidated object;
      in response to associating the one or more parameters included in the first object and the one or more parameters included in the second object with the consolidated object, determining a difference in description of the one or more parameters included in the first object and the one or more parameters included in the second object;
      in response to determining the difference:
         searching a plurality of API specifications for a third API specification related to the one or more parameters included in the first object and the one or more parameters included in the second object;
         identifying a third object in the third API specification related to the one or more parameters included in the first object or the one or more parameters included in the second object; and
         updating the consolidated object to include at least a portion of the third object in the third API specification; and
   generating a consolidated API specification that includes the consolidated object and includes a description of the one or more parameters of the first object and the one or more parameters of the second object that are associated with the consolidated object in a single API specification.

12. The non-transitory computer-readable medium of claim 11, wherein the operations further comprise:
   identifying a fourth object in the second API specification, the fourth object including one or more parameters;
   classifying a type of the fourth object; and
   associating, based on the type of the first object and the type of the fourth object, one or more parameters of the first object and the fourth object with the consolidated object.

13. The non-transitory computer-readable medium of claim 11, wherein the first API specification is received from a first API repository and the second API specification is received from a second API repository.

14. The non-transitory computer-readable medium of claim 11, further comprising:
   validating the consolidated object, the validating including:
      extracting response information from the third object in the third API specification;
      communicating, to a native API system, a request using the consolidated object;
      comparing a response from the native API system with the response information to determine a validity of the consolidated object; and
      responsive to the consolidated object being valid, generating a validation model that includes the third object in the third API specification and the consolidated object.

15. The non-transitory computer-readable medium of claim 11, wherein the operations further comprise generating the first API criteria, wherein the generating the first API criteria includes:
   extracting an API criteria of the first API specification;
   removing encoding from the API criteria of the first API specification;
   replacing alphanumeric characters in the API criteria of the first API specification with blank spaces;
   removing instances of character sequence "api" from a start and an end of the API criteria of the first API specification; and
   removing blank spaces from the API criteria of the first API specification.

16. The non-transitory computer-readable medium of claim 11, wherein the operations further comprise, responsive to the first object and the second object being classified as dictionary objects:
identifying a first key parameter and a first value parameter of the first object;
identifying a second key parameter and a second value parameter of the second object;
comparing the first key parameter to the second key parameter;
responsive to the first key parameter being identical to the second key parameter, comparing the first value parameter with the second value parameter;
responsive to the first value parameter being identical to the second value parameter the associating includes adding the first key parameter and the first value parameter to the consolidated object; and
responsive to the first value parameter being different than the second value parameter, the associating includes adding the first key parameter, the first value parameter, and the second value parameter to the consolidated object; and
responsive to the first key parameter being different than the second key parameter, the associating includes adding the first key parameter, the first value parameter, the second key parameter, and the second value parameter with the consolidated object.

17. The non-transitory computer-readable medium of claim 11, wherein the operations further comprise, responsive to the first object and the second object being classified as list objects:
identifying each item in a list parameter of the first object;
identifying each item in a list parameter of the second object;
comparing each item in the list parameter of the second object to the items in the list parameter of the first object;
responsive to one or more items in the list parameter of the second object being different than each item in the list parameter of the first object, the associating includes adding each item in the list parameter of the first object and the one or more items in the list parameter of the second object that are different than each item in the list parameter of the first object to the consolidated object; and
responsive to each of the items in the list parameter of the second object being identical to one or more items in the list parameter of the first object, the associating includes adding each item in the list parameter of the first object to the consolidated object.

18. The non-transitory computer-readable medium of claim 11, wherein the operations further comprise, responsive to the first object and the second object being classified as string objects:
comparing a string parameter in the first object to a string parameter in the second object;
responsive to the string parameter in the first object being identical to the string parameter in the second object, the associating includes adding the string parameter in the first object to the consolidated object; and
responsive to the string parameter in the first object being different than the string parameter in the second object, the associating includes adding the string parameter in the first object and the string parameter in the second object to the consolidated object.

19. The non-transitory computer-readable medium of claim 11, wherein the operations further comprise, responsive to the first object being classified as a dictionary object and the second object being classified as a list object:
identifying each item in a list parameter of the second object;
determining whether each item in the list parameter of the second object is a dictionary item;
responsive to each item in the list parameter of the second object being the dictionary item:
identifying a first key parameter of the first object;
comparing the first key parameter to the items in the list parameter of the second object;
responsive to the first key parameter being identical to one or more items in the list parameter of the second object, the associating includes adding the first key parameter to the consolidated object; and
responsive to the first key parameter being different than each of the items in the list parameter of the second object, the associating includes adding each parameter in the first object and each parameter in the second object to the consolidated object; and
responsive to one or more item in the list parameter of the second object being different than a dictionary item, the associating includes adding each parameter in the first object and each parameter in the second object to the consolidated object.

20. The non-transitory computer-readable medium of claim 11, wherein the third API specification is a crowd-source API specification.

* * * * *